US007715034B2

(12) United States Patent
Anno

(10) Patent No.: US 7,715,034 B2
(45) Date of Patent: May 11, 2010

(54) DATA PROCESSING DEVICE AND DATA STORAGE DEVICE FOR PERFORMING TIME CERTIFICATION OF DIGITAL DATA

(75) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1351 days.

(21) Appl. No.: 10/951,067

(22) Filed: Sep. 27, 2004

(65) Prior Publication Data

US 2005/0094178 A1    May 5, 2005

(30) Foreign Application Priority Data

Oct. 17, 2003  (JP)  ............................. 2003-358035
Nov. 18, 2003  (JP)  ............................. 2003-388414

(51) Int. Cl.
*G06F 15/00* (2006.01)
*G06F 13/00* (2006.01)

(52) U.S. Cl. ..................................... 358/1.15; 358/1.14

(58) Field of Classification Search .................. 358/1.1, 358/1.8, 1.9, 1.13, 1.15, 1.18, 474, 500, 448; 382/100; 713/176, 178
See application file for complete search history.

(56) References Cited

U.S. PATENT DOCUMENTS

| 5,383,029 | A | 1/1995 | Kojima |
| 5,481,672 | A | 1/1996 | Okuno et al. |
| 6,473,203 | B1 | 10/2002 | Hisatomi et al. |
| 6,931,537 | B1 | 8/2005 | Takura et al. |
| 2002/0080398 | A1* | 6/2002 | Matsushima ............... 358/1.15 |
| 2003/0212828 | A1* | 11/2003 | Miyazaki et al. ............ 709/248 |
| 2006/0103889 | A1* | 5/2006 | Adachi et al. .......... 358/426.04 |

FOREIGN PATENT DOCUMENTS

| EP | 0435254 A2 | 7/1991 |
| EP | 0516898 A1 | 12/1992 |
| EP | 1283485 A1 | 2/2003 |
| EP | 1330107 A1 | 7/2003 |
| JP | 4-271466 A | 9/1992 |
| JP | 06-078144 | 3/1994 |
| JP | 10-290359 A | 10/1998 |
| JP | 11-175273 | 7/1999 |
| JP | 2000-056681 A | 2/2000 |

(Continued)

OTHER PUBLICATIONS

C. Adams (Entrust Technologies) P. Cain (BBN) D. Pinkas (BULL) R. Zuccherato (Entrust Technologies), Internet X. 509 Public Key Infrastructure Time Stamp Protocol (TSP), IETF Standard-working-draft, Internet Engineering Task Force, IETF, CH, vol. pkix No. 4, Oct. 1999, United States.

*Primary Examiner*—Gabriel I Garcia
(74) *Attorney, Agent, or Firm*—Canon USA Inc IP Division

(57) ABSTRACT

A data processing device includes an image capturing unit for capturing an image so as to generate digital data, a time certification request unit for requesting time certification of the digital data in order to acquire time information regarding when time certification was performed, and a storage control unit for controlling the digital data associated with the time information to be stored in a storage destination. Thus, time certification of an image can be easily performed, and confirmation thereof can also be readily performed.

12 Claims, 30 Drawing Sheets

FOREIGN PATENT DOCUMENTS

| | | |
|---|---|---|
| JP | 2001-111963 A | 4/2001 |
| JP | 2001-142398 A | 5/2001 |
| JP | 2003-187015 A | 7/2003 |
| JP | 2003-258792 A | 9/2003 |
| JP | 2003-284113 A | 10/2003 |
| WO | 0051286 A1 | 8/2000 |
| WO | 0064094 A1 | 10/2000 |
| WO | 0103363 A1 | 1/2001 |

* cited by examiner

FIG. 12A

ORDER SHEET

MARCH 31, 2003
AAAA CO. LTD.
BBBB

MARCH 31, 2003
CCCC CO. LTD.
DDDD

THIS IS TO PLACE AN ORDER
FOR THE FOLLOWING:
DIGITAL CAMERA DDDD: 400 UNITS @ $ 600

PAPER DOCUMENT

FIG. 12B

ORDER SHEET

2003.Apr.01
10:03:25.123
Saved at 556 1089

MARCH 31, 2003
AAAA CO. LTD.
BBBB

MARCH 31, 2003
CCCC CO. LTD.
DDDD

THIS IS TO PLACE AN ORDER
FOR THE FOLLOWING:
DIGITAL CAMERA DDDD: 400 UNITS @ $ 600

EXAMPLE OF PRINTOUT AFTER
TIME CERTIFICATION

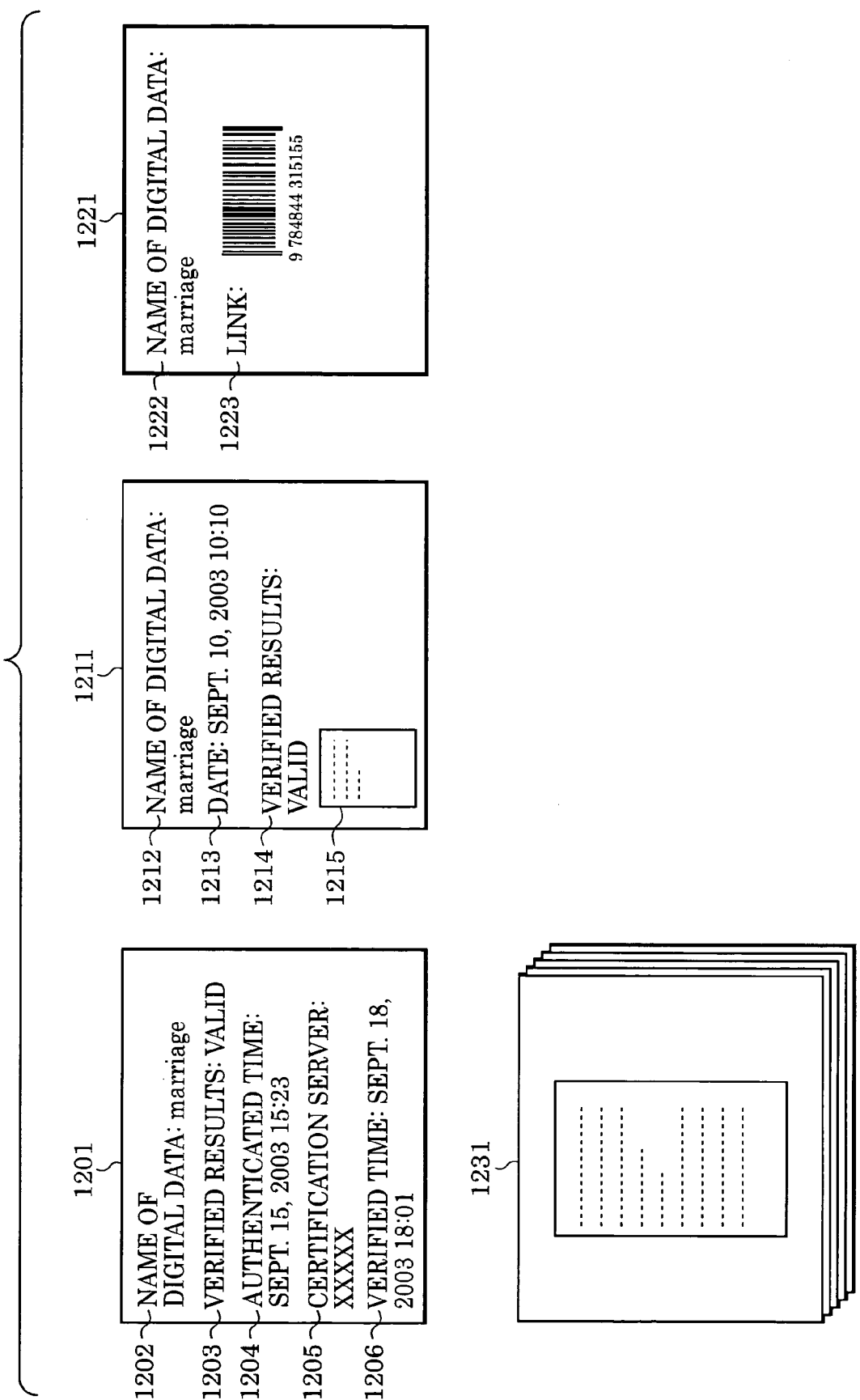

DATA PROCESSING DEVICE AND DATA STORAGE DEVICE FOR PERFORMING TIME CERTIFICATION OF DIGITAL DATA

CROSS REFERENCE TO RELATED APPLICATIONS

This application claims priority from Japanese Patent Application Nos. 2003-358035 filed Sep. 29, 2003 and 2003-388414 filed Nov. 18, 2003, which are hereby incorporated by reference herein.

BACKGROUND OF THE INVENTION

1. Field of the Invention

The present invention relates to a data processing device and a data processing method for performing time certification of digital data generated by capturing an image. The present invention also relates to a data storage device and a data storage method for providing time certification of data stored.

2. Description of the Related Art

Conventionally, data processing devices, such as printers, facsimile devices, multi-function printers, copiers, digital cameras, and the like, have clocks built in. Time kept by the clock has been recorded on paper documents as the time at which data was created, or the time at which a job was processed (for example, Japanese Patent Laid-Open No. 06-078144).

Alternatively, a clock has been built into data processing devices such as printers, facsimile devices, multi-function printers, and the like, with time kept by the above-described clock being recorded as data of the time at which data was created, or the time at which a job was processed (for example, Japanese Patent Laid-Open No. 11-175273), and with the data, to which such time is appended, being stored in a data storage device.

However, the above-described conventional data processing devices have had the following problems. The time kept by the clock built into the above-described data processing device could be set by an administrator or user of the data processing device, and accordingly, setting the clock to a different time from the real time could not be prevented. In other words, the time at which data was created, or the time at which a job was processed, appended to paper documents, has not always been precise time.

Additionally, the time that is appended by the control software of a data processing device has not been dependable from the standpoint of a third party, and also the time information read out from the data storage device has not always been precise information.

Additionally, there has been the possibility of the data stored in the data storage device being modified or altered following time information being appended thereto.

SUMMARY OF THE INVENTION

The present invention provides a data processing device and a data processing method capable of time certification of a paper document, and easy confirmation thereof.

Additionally, the present invention provides a data storage device and a data storing method capable of time certification of data stored with ease, and preventing the data following time certification from modification and tampering.

According to an aspect of the present invention, a data processing device includes: an image capturing unit configured to capture an image and generate digital data corresponding to the image; a time certification request unit configured to request time certification of the digital data in order to acquire time information comprising a time that time certification was performed; and a storage control unit configured to control the digital data associated with the time information to be stored in a storage destination identified in storage destination information.

According to another aspect of the present invention, a data processing method includes: capturing an image; generating digital data corresponding to the image; requesting a time certifying authority to perform time certification in order to acquire time information comprising a time that time certification was performed; and controlling the digital data associated with the time information to be stored in a storage destination.

According to yet another aspect of the present invention, a data storage device for storing changeable data to a storage destination includes: a time certification request unit configured to request time certification of selected changeable data in order to acquire time information to be acquired as a result of time certification; a generating unit configured to generate unchangeable data by adding the selected changeable data with the time information acquired by the time certification request unit; and a sending unit configured to send the unchangeable data generated by the generating unit to the storage destination in the event that data subjected to time certification is requested.

According to still another aspect of the present invention, a data storing method for storing changeable data in a data storage device includes: requesting time certification of selected data selected from the changeable data in order to acquire time information to be obtained as a result of time certification; generating unchangeable data by adding the time information acquired to the selected data; and sending the unchangeable data generated in the event that the selected data subjected to time certification is requested.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 12A and 12B are diagrams illustrating a paper document and printout thereof following time certification.

FIG. 32 is a diagram illustrating an example of printout of verified results of time certification.

DESCRIPTION OF THE EMBODIMENTS

Embodiments of the present invention will now be described in detail in accordance with the accompanying drawings. Description will be made regarding an embodiment of a data processing device, a data processing method, a data storage device, and a data storing method, according to the present invention, with reference to the drawings. The data processing device according to the present embodiment will be illustrated as being applied to a time certification system.

System Configuration

Figure 1:
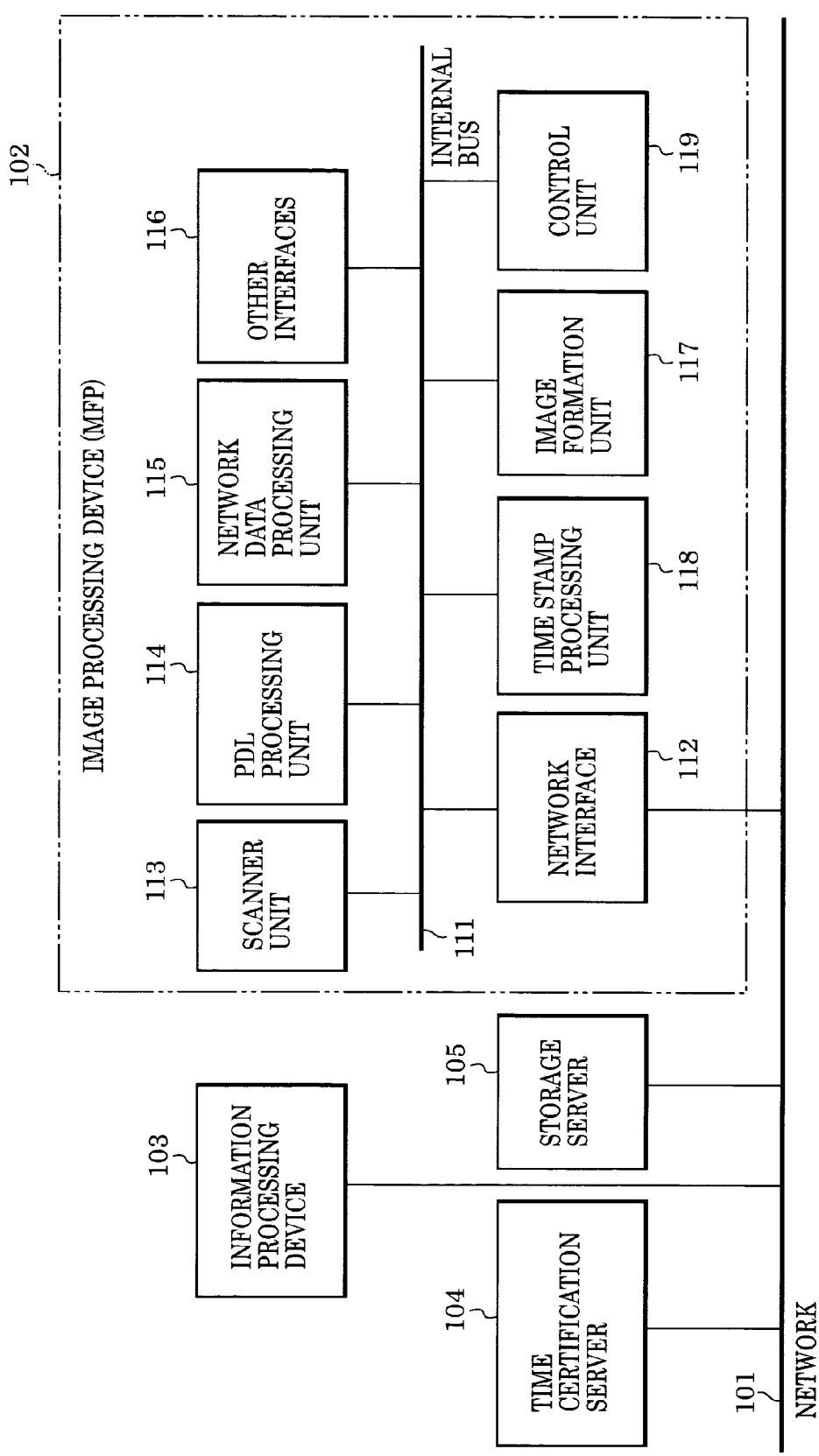
FIG. 1 is a diagram illustrating the configuration of a time certification system and the electric configuration of an image processing device according to an embodiment of the present invention.

FIG. 1 is a diagram illustrating the overall configuration of any exemplary time certification system and the electric configuration of an image processing device. This time certification system has a configuration in which a multi-function printer (MFP) 102 serving as an image processing device, an information processing device 103, a time certification server (time certifying authority) 104, a storage server 105, and the like are connected via a network 101.

The multi-function printer (MFP) 102 serving as an image processing device includes a function to scan a paper document, a function to process a print job sent from the information processing device 103 so as to perform printout, a function to process printout data sent from the information processing device 103 with FTP (file transfer protocol), a function to scan a paper document so as to convert the image thereof into PDF data in order to send an e-mail to which the portable document format (PDF) data is appended to the information processing device 103 or the storage server 105, and so forth.

The information processing device 103 has a function to generate digital data using an application such as Microsoft® Word or the like, a function to calculate the hash value of the digital data so as to send the hash value to the time certification server 104, a function to receive a time stamp from the time certification server 104 following the previous function, a function to upload the digital data to the storage server 105, and so forth.

The time certification server 104, which includes a clock to keep precise time conforming to standard time, has a function to perform time certification based on the clock, a function to generate a time stamp thereof, further in accordance with a request from the image processing device 102, the information processing device 103, the storage server 105, or the like, a function to send the time stamp thereof, and a function to verify the generated time stamp.

The storage server 105, in accordance with a request from the image processing device 102, the image processing device 103, the time certification server 104, or the like, has a function to receive and store digital data, a function to send the stored digital data, as described later, a function to request time certification of the stored digital data, and so forth.

While only one device corresponding to each image processing device 102, information processing device 103, time certification server 104, and storage server 105 is connected to the network 101 shown in FIG. 1, multiple devices corresponding to each device may be connected to the network 101. While this network 101 is made up of a local area network (LAN), other networks such as a wide area network (WAN) may be employed as long as multiple computers can connect to the network. With an office LAN on a floor or within a building, an Ethernet is frequently employed for connecting computers. The network to be employed may be either an Intranet or the Internet. That is to say, either an arrangement wherein a time certifying authority 104 and the storage server 105 exist on the Internet, or an arrangement wherein a time certifying authority 104 and the storage server 105 exist on an Intranet, may be realized. With regard to a connection method for the Internet, a narrow band connection with phone dialup, a broadband connection with xDSL (xDigital Subscriber Line) or optical fiber, or the like, may be employed without being restricted to any particular connection method.

The MFP 102 has a configuration wherein a network interface 112, a scanner unit 113, a PDL processing unit 114, a network data processing unit 115, other interfaces 116, an image formation unit 117, a time stamp processing unit 118, and a control unit 119 are connected to an internal bus 111.

The scanner unit 113 scans a paper document so as to generate image data. The PDL processing unit 114 processes a printout job sent from the information processing device 103. The network data processing unit 115 processes printout data sent from the information processing device 103 with the FTP protocol, converts image data on the scanned paper document into PDF data so as to append the PDF data to an e-mail, and then sends the e-mail to the information processing device 103, for example.

Interfaces 116 other than LAN include interfaces such as Universal Serial Bus (USB), FireWire®, a phone line used by a facsimile device, Personal Computer Memory Card International Association (PCMCIA, also known as PC Cards), and so forth, which perform sending and receiving of data. The image formation unit 117 processes data so as to print the data, and generates an image to be sent to the information processing device 103. The time stamp processing unit 118 communicates with the time certifying authority 104 connected to the network 101, requests the time certifying authority 104 to generate a time stamp, and receives a time stamp sent from the time certifying authority 104. The control unit 119 centrally controls each unit. The MFP 102 can communicate with the information processing device 103, the time certification server 104, and the storage server 105 by means of the network interface 112.

Figure 2:
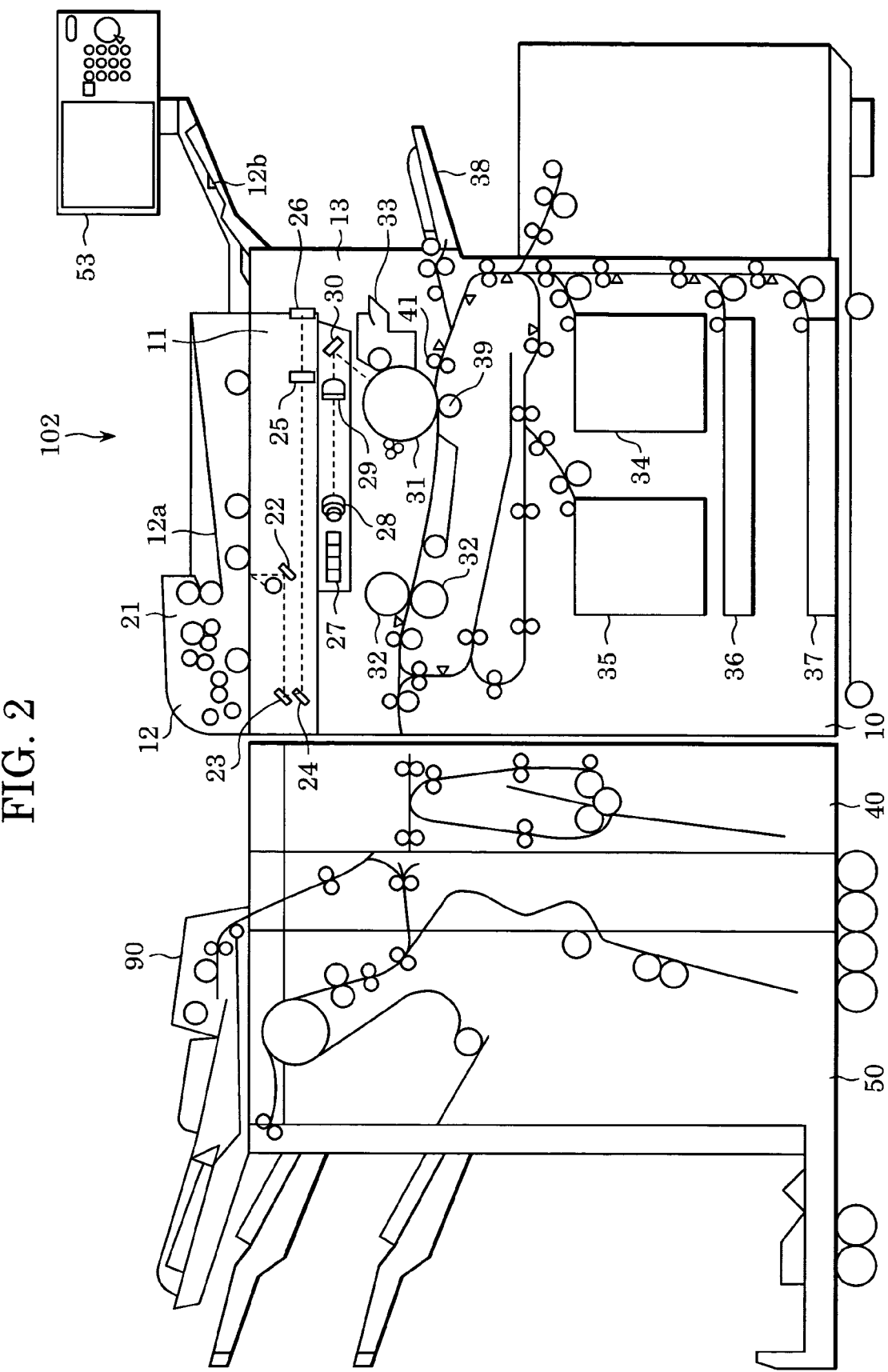
FIG. 2 is a diagram illustrating the configuration of an image processing device (MFP).

FIG. 2 is a diagram illustrating the configuration of the image processing device (MFP) 102. This MFP 102 is made up of an MFP body 10, a folding device 40, and a finisher 50. The MFP body 10 is included in the scanner unit 113, which is made up of an image reader 11 for reading a document image, and a printer 13 corresponding to a part of the image formation unit 117. An operating panel 53 which displays various information, and also inputs operational information from an operator, as described above, is provided. In the exemplary MFP 102 shown in FIG. 2, the operating panel 53 is on the upper right portion in front of the MFP body 10.

A document feeder 12 is mounted on the image reader 11. The document feeder 12 sequentially feeds documents stacked face-up on a document tray 12a from the top page thereof one by one in the left direction, transports the document onto a platen glass via a curved path so as to stop at a predetermined position, and reads a paper document by controlling the scanner unit 21 to scan the document from left to right in this state. Following reading the document, the document feeder 12 discharges the document toward an external tray 12b.

The face of the document to be read is irradiated by the light from a lamp of the scanner unit 21, and the reflected light from the document is guided to a lens 25 via mirrors 22, 23, and 24. The light passing through this lens 25 forms an image on the imaging face of the image sensor 26.

Reading the whole image of a document is performed by transporting the scanner unit 21 in the sub scanning direction, while reading the image of the document in the main scanning direction for each line with the image sensor 26. The image optically read is converted into image data by the image sensor 26 so as to output the converted image. The image data output from the image sensor 26 is subjected to predetermined processing at an unshown image signal control unit (image processing circuit), and then is input to an unshown exposure control unit (laser control circuit) of the printer 13 as video signals. The image data output from the image sensor 26 is sent to the network data control unit 115 so as to be converted into PDF data, as described above.

The exposure control unit of the printer 13 modulates the laser light output from a laser device (not shown), and the modulated laser light is irradiated on a photosensitive drum 31 via lenses 28 and 29, and a mirror 30, while being scanned by a polygon mirror 27.

An electrostatic latent image corresponding to the scanned laser light is formed on the photosensitive drum 31. The electrostatic latent image on this photosensitive drum 31 is visualized as a developing agent image by the developing agent supplied from a developing apparatus 33. Sheets are fed from the cassettes 34, 35, 36, and 37, a manual feeder 38, or a both side transporting path, at a timing synchronized with start of the irradiation of a laser light, and are transported to the image formation unit via a resist roller 41.

This sheet is transported to between the photosensitive drum 31 and a transfer roller 39, the developing agent image formed on the photosensitive drum 31 is transferred onto a sheet fed by the transfer roller 39. The sheet on which the developing agent image is transferred is transported to a fixing unit 32, and the fixing unit 32 fixes the developing agent image on the sheet by thermally pressing the sheet. The sheet passing through the fixing unit 32 is discharged from the printer 13 to the external folding device 40 via a flapper and a discharge roller.

Here, in the event that the sheet is discharged in a state with the image formation side facing down (face-down state), the sheet passed through the fixing unit 32 is temporarily led into a reverse path by switching operation of the flapper, following the trailing edge of the sheet being passed through the flapper, the sheet is switched back so as to be discharged from the printer 13 by the discharge roller.

Hard sheets such as overhead projector (OHP) sheets are fed from a manual feeder 38. In the event that an image is formed on such a hard sheet, the sheet is not led into the reverse path, and is discharged from the discharge roller in a state wherein the image formation side faces up (face-up state).

Furthermore, in the event that both side recording for forming images on both sides is set, following the sheet being led into the reverse path by switching operation of the flapper, the sheet is transported to a both side transport path, the sheet led into the both side transport path is fed to between the photosensitive drum 31 and the transfer unit in the above-described timing again.

The sheet discharged from the printer 13 is sent to the folding device 40. This folding device 40 performs folding a sheet in a Z-shape. For example, in the event that sheets in A3 or B4 paper size with folding processing are specified, the folding device 40 performs folding processing. In other case, the sheets discharged from the printer 13 are passed through the folding device 40, and are sent to the finisher 50. An inserter 90 is provided for feeding special sheets such as cover sheets, and inserting sheets. Various processing such as bookbinding, stapling, and punching is performed at the finisher 50.

Figure 3:
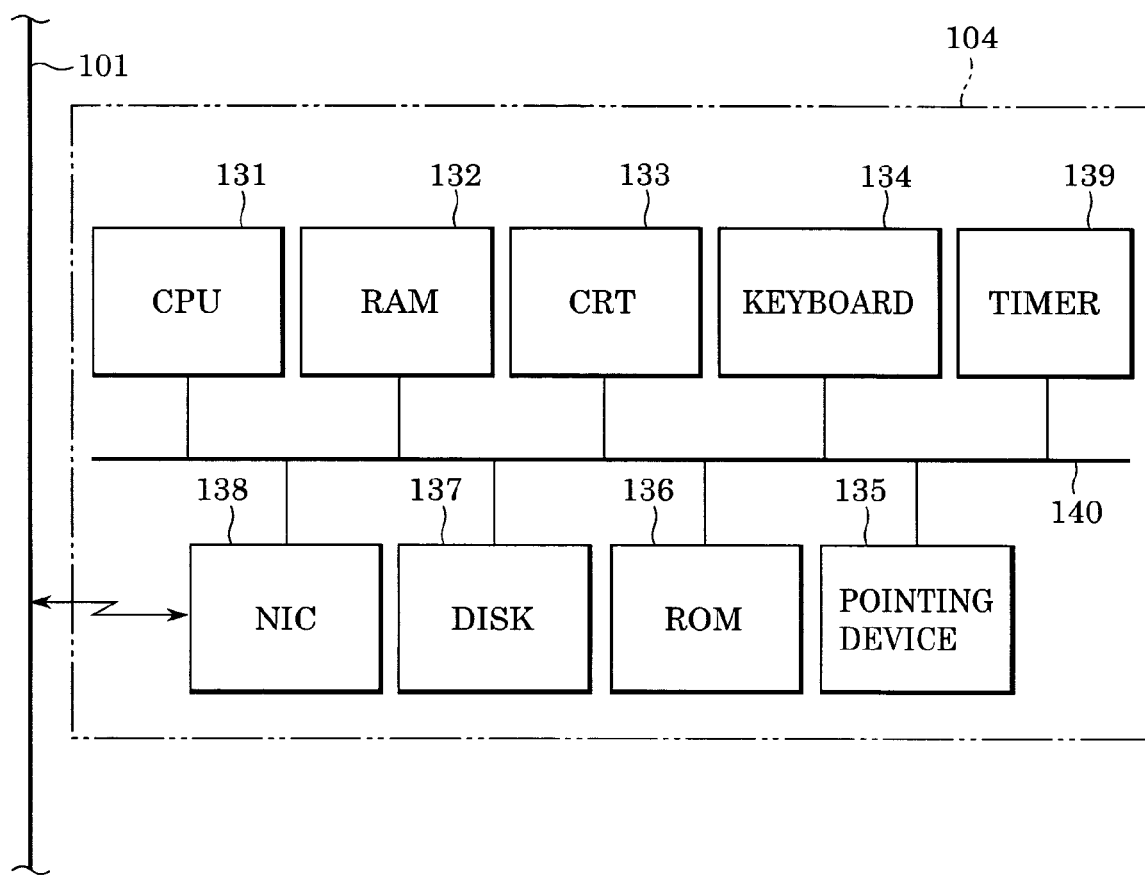
FIG. 3 is a diagram illustrating the configuration of a time certification server.

FIG. 3 is a diagram illustrating the configuration of the time certification server 104. Here, the time certification server 104, the storage server 105, and the information processing device 103 are made up of general-purpose PCs, which have generally the same configuration, so description will be made only regarding the time certification server 104, representatively. Note that, the time certification server 104 differs in configuration from the configuration of the storage server 105 and that of the information processing device 103, in that the time certification server 104 includes a clock unit keeping precise time, and can acquire precise time based on this clock. On the other hand, the storage server 105 has a large capacity storage device capable of storing a great deal of image data, unlike the time certification server 104 and the information processing device 103.

The time certification server 104 has a configuration wherein a central processing unit (CPU) 131, random-access memory (RAM) 132, a display device, such as a cathode ray tube (CRT) 133, a keyboard 134, a pointing device 135, read-only-memory (ROM) 136, a hard disk (DISK) 137, a network interface card (NIC) 138, and a timer 139 are mutually connected via system bus 140. A program controlling the time certification server 104 is stored in the hard disk (DISK) 137 serving as a recording medium, which is read out as necessary, and is executed by the CPU 131. The timer 139 includes a clock unit keeping precise time, as described above. The CPU 131 displays various information on the CRT 133, and receives instructions of the user through the keyboard 134 or pointing device 135. Additionally, the CPU 131 communicates with the external information processing device 103, storage server 105, MFP 102, or the like through the NIC 138 and the network 101.

Operations for Acquiring Time Certification

Figure 4:
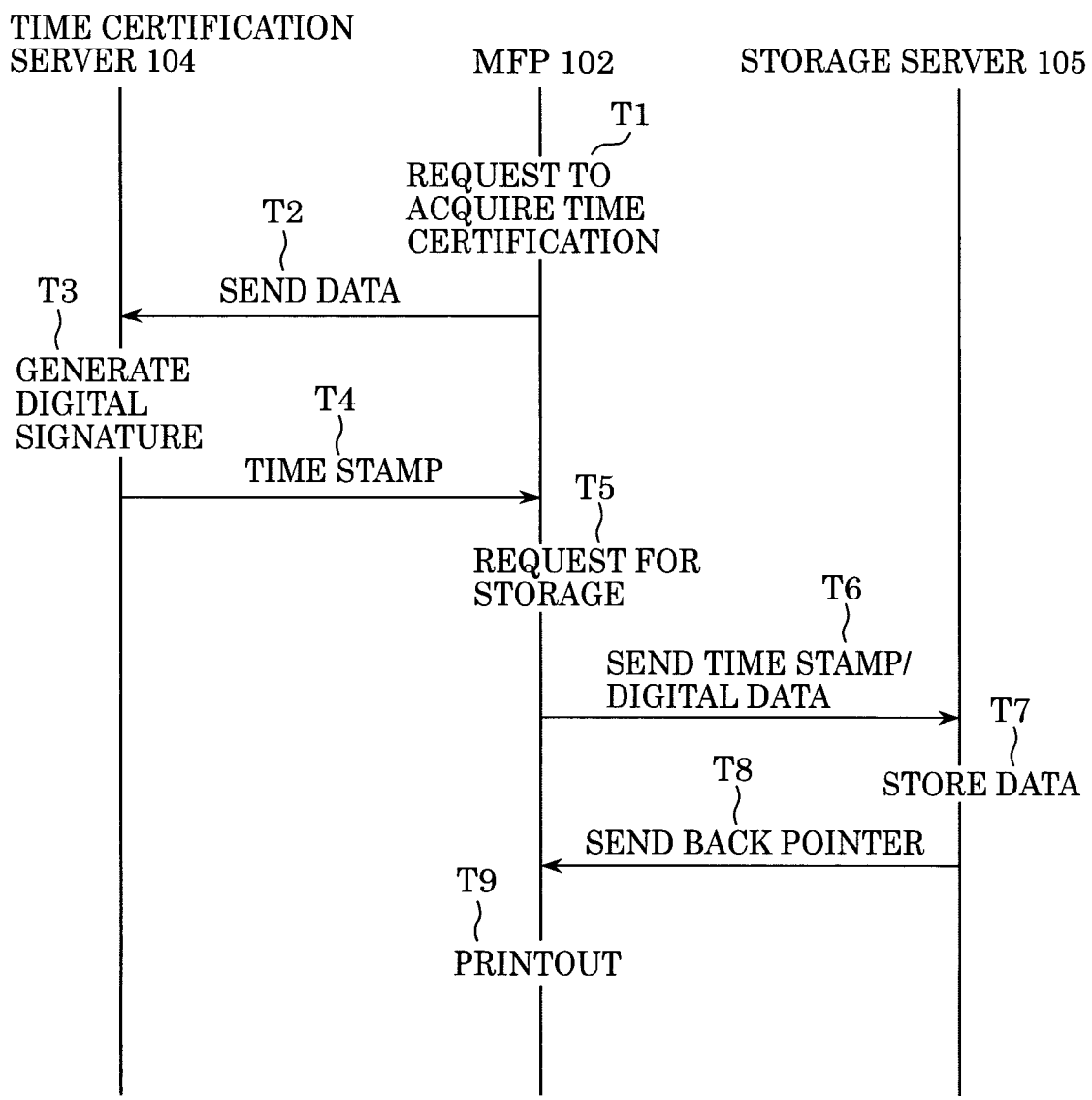
FIG. 4 is a diagram illustrating the data transfer between the time certification server, the MFP, and the storage server in operation for acquiring time certification.

The time certification system having this configuration is described next. FIG. 4 is a diagram illustrating data transfer between the time certification server 104, the MFP 102, and the storage server 105 in operation for acquiring time certification. In response to a request for acquiring time certification from the user (T1), the MFP 102 sends the digital data of a paper document to the time certification server 104 (T2). The time certification server 104 generates an electric signature (T3), and sends back this to the MFP 102 as a time stamp (T4).

The MFP 102 performs a request for storage to the storage server 105 (T5), and sends the time stamp and the digital data to the storage server 105 (T6). The storage server 105 stores the time stamp and the digital data (T7), and sends back the pointer to a storage destination to the MFP 102 (T8). The MFP 102 performs processing for synthesizing the time stamp with the digital data, and the like so as to perform printout (T9).

Figure 5:
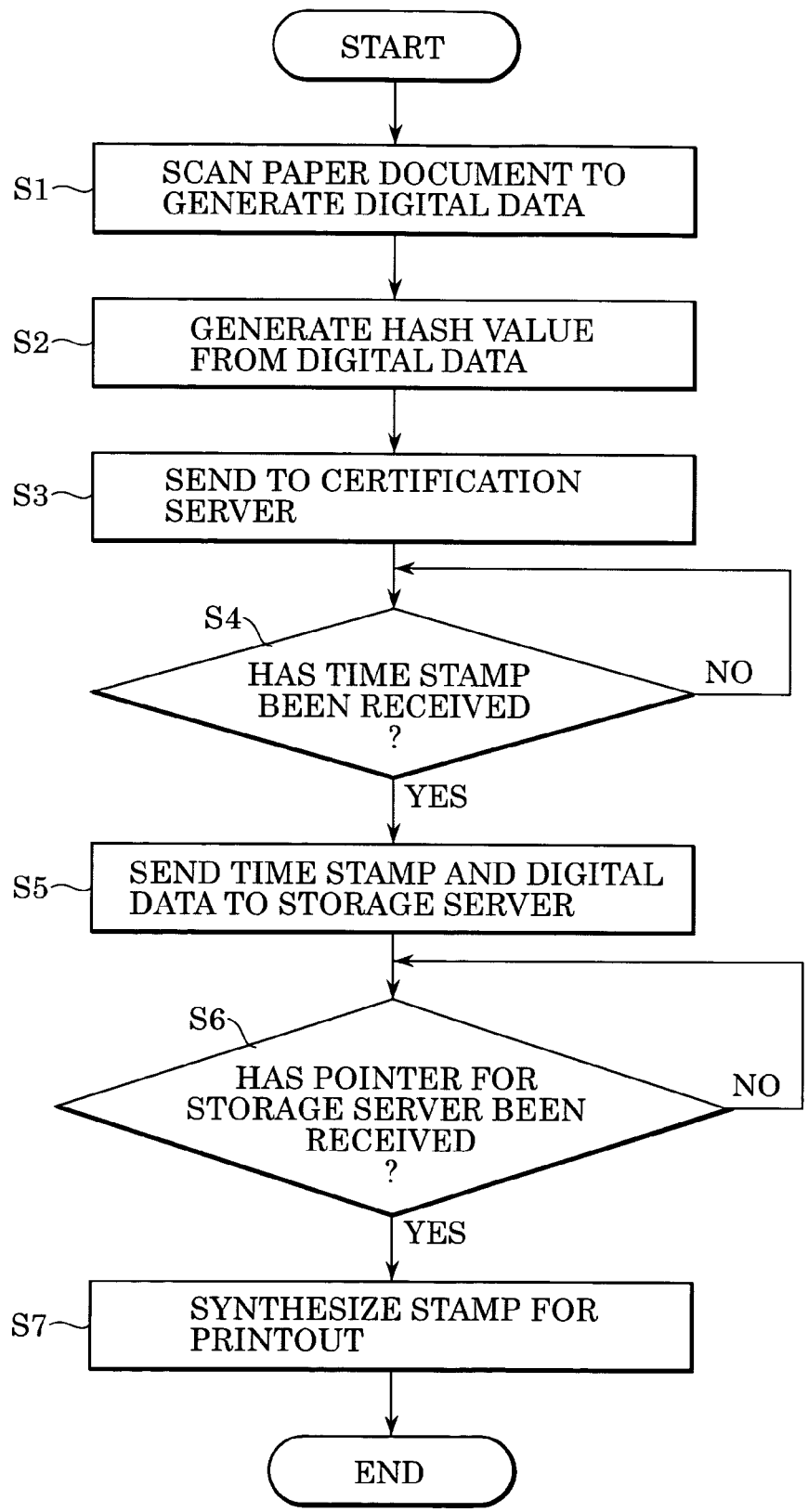
FIG. 5 is a flowchart illustrating the operational procedures of the MFP in operation for acquiring time certification.

Individual operation for acquiring time certification regarding the time certification server 104, the MFP 102, and the storage server 105 is described below. FIG. 5 is a flowchart illustrating operational procedures of the MFP 102 in operation for acquiring time certification. This processing program is stored in a recording medium (not shown) within the control unit 119, which is executed by a CPU (not shown) within the control unit 119 upon the user setting a paper document onto the scanner of the MFP 102 and then selecting an ACQUIRE TIME CERTIFICATION function button on the operating panel 53 (see FIG. 13).

First, upon the user depressing a start button, the scanner unit 113 scans the paper document set thereon so as to generate digital data (Step S1). As for the format of the digital data to be generated here, the most appropriate format differs depending on whether the scan is a black-and-white scan or color scan (for example, JPEG (Joint Photographic Experts Group), Bit Map, TIFF (tagged image file format), and so forth). Furthermore, the digital data is converted into the file format of the application including the image data (for example, PDF format). Note that any kind of a data format may be employed as long as the format is a digital data format.

The time stamp processing unit 118 generates a hash value regarding the generated digital data using a one-way function (Step S2). The one-way function and the parameters thereof employed here are those specified by the time certification server 104. That is to say, in the event of performing operations of time certification, the user sets which time certification server should be employed on the operating panel 53 (see FIG. 14), and accordingly, the one-way function and the parameters thereof are uniquely determined from this setting information. The hash value generated in Step S2 is sent to the time certification server 104 via the network 101 with the network interface 112 so as to request the time certification server 104 to provide time certification (Step S3).

Next, the MFP 102 awaits the reception of a time stamp from the time certification server 104 (Step S4). Upon a time stamp being received, the MFP 102 requests the storage server 105, which is specified on the operating panel by the user, for storage, and sends this time stamp and the digital data generated by scanning a paper document to the storage server 105 via the network 101 with the network interface (Step S5).

Next, the time stamp processing unit 118 waits for the receipt of the time stamp and the pointer to the storage destination from the storage server 105 via the network interface 112 (Step S6). In response to receiving the time stamp and the pointer to the storage destination from the storage server 105, the time stamp processing unit 118 extracts time from the time stamp, and converts the pointer to the storage destination into a barcode or the like. Furthermore, the image formation unit 117 creates image data of the stamp to be printed as a stamp mark based on the time and the converted barcode, synthesizes this stamp mark with the digital data obtained by scanning so as to create image data for printout, and then prints this (Step S7). At this time, printout by the image formation unit 117 is performed in accordance with the settings content (printout form) specified on the operating panel 53 by the user (see FIG. 16), i.e., the place at which to synthesize stamp marks, whether or not to include the pointer to a storage destination, and whether or not to execute simultaneous printout of scanned data. Processing of FIG. 5 (operational procedures of the MFP 102 in operation for acquiring time certification) then ends.

FIGS. 12A and 12B are diagrams illustrating a paper document and printout thereof after time certification. While FIG. 12A illustrates a paper document, FIG. 12B illustrates an example of printout following time certification wherein the stamp made up of a unique mark is printed on the upper right portion of the recording sheet in an overwrite way. The time data is filled in the stamp received from the time certification server, which is "Apr. 1, 2003 10:03:25:123" in this example. The pointer "5561089" corresponding to the storage location is also shown.

The time stamp received from the time certification server 104 includes certified time data in the event of setting printout following time certification being received. With the MFP 102 according to the present embodiment, the time stamp processing unit 118 designs a unique mark, fills this time data in the mark, generates a time stamp similar to a post-office stamp, and then synthesizes this stamp with the scanned image data so as to print this. Furthermore, a pointer indicating the location of a time stamp stored for verifying certified time at a later date is also synthesized with the scanned image data so as to print this.

Figure 6:
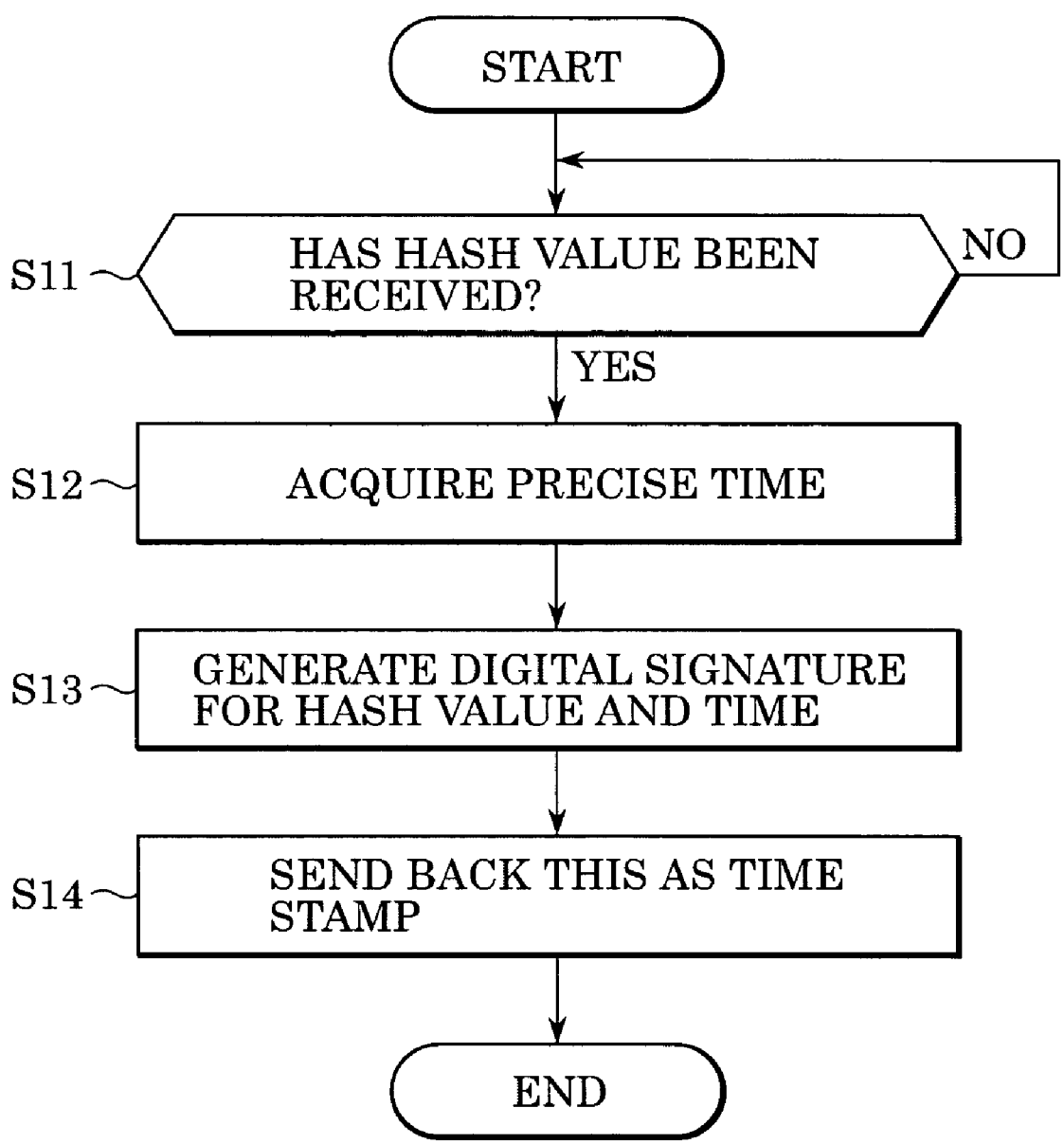
FIG. 6 is a flowchart illustrating the operational procedures of the time certification server in operation for acquiring time certification.

FIG. 6 is a flowchart illustrating the operational procedures of the time certification server 104 in operation for acquiring time certification. This processing program is stored in the hard disk (DISK) 137 serving as a recording medium within the time certification server 104, which is executed by the CPU 131 within the time certification server 104. First, the time certification server 104 waits for the reception of a hash value from the MFP 102 (Step S11). In response to the reception of the hash value, the time certification server 104 acquires precise time information from the clock unit within the timer 139 (Step S12). The time certification server 104 then generates a digital signature corresponding to this time information and the hash value with a secret key possessed by the time certification server 104 (Step S13). The time certification server 104 then sends the generated digital signature back to the MFP 102 as a time stamp (Step S14). Processing of FIG. 6 (operational procedures of the time certification server 104 in operation for acquiring time certification) then ends. The protocol to be used for this certification sequence is the protocol specified by the time certification server 104. In general, this protocol is standardized, and a time stamp is acquired in accordance with this protocol.

Figure 7:
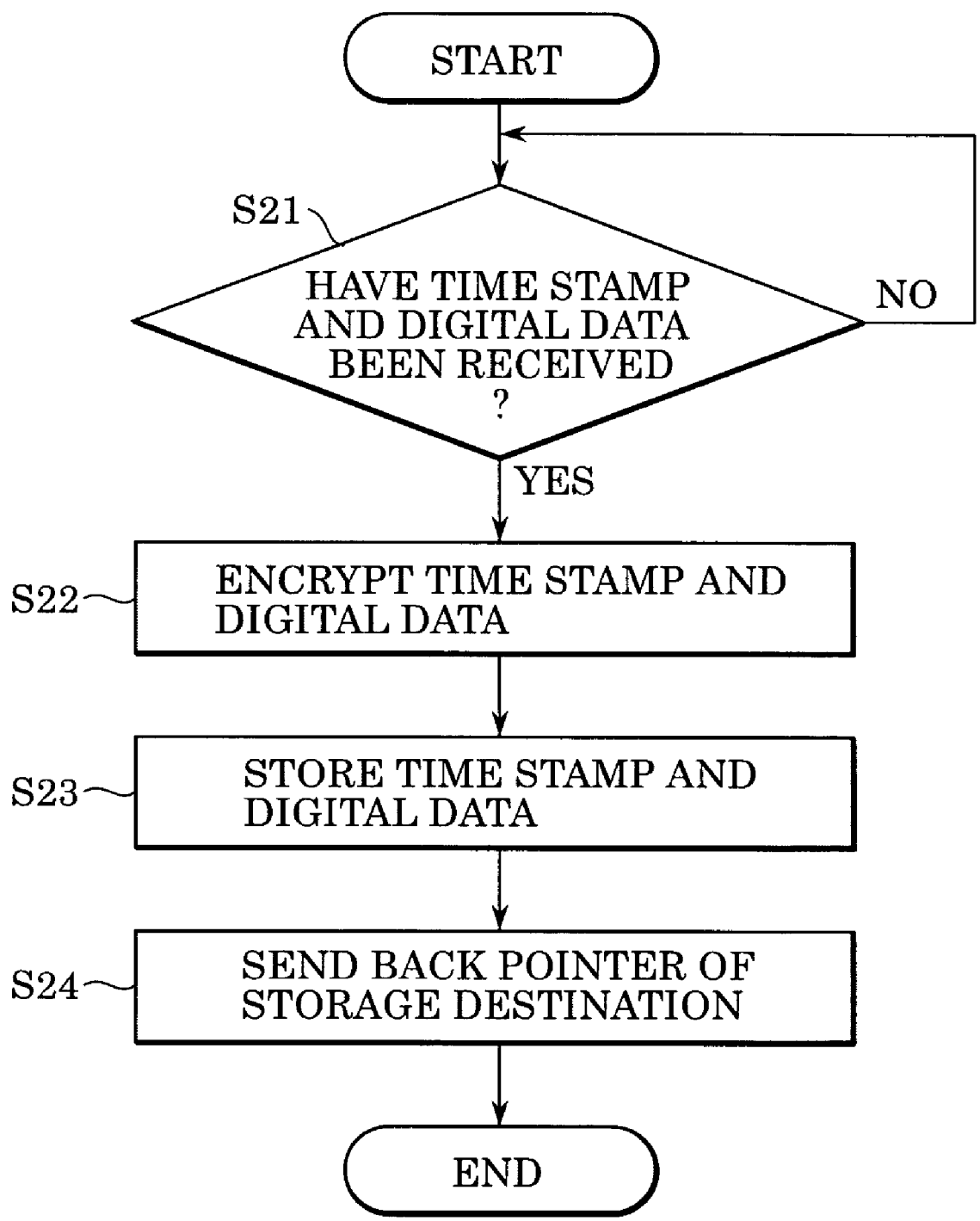
FIG. 7 is a flowchart illustrating the operational procedures of the storage server in operation for acquiring time certification.

FIG. 7 is a flowchart illustrating operational procedures of the storage server 105 in operation for acquiring time certification. This processing program is stored in a recording medium (not shown) within the storage server 105, which is executed by a CPU (not shown) within the storage server 105. First, the storage server 105 waits for reception of a time stamp and digital data from the MFP 102 (Step S21). In response to reception of the time stamp and digital data, the storage server 105 encrypts the received time stamp and digital data (Step S22). Owing to this encryption of the time stamp and digital data, tampering is prevented. This encryption is performed with either a method wherein only the storage server 105 can perform decryption or a method wherein only the person trusted by the storage server 105 can perform decryption. For example, a common key method is employed wherein the encryption key is known only by the storage server, or a disclosed key method is employed in which a trusted person encrypts time stamp and digital data with a disclosed key so as to send the encrypted data, and a trusted person decrypts the encrypted data with his/her secret key.

The storage server 105 sets the encrypted time stamp in the digital data, stores this therein according to the storing method (optional alternatives) set on the operating panel 53 (see FIG. 15) by the user (Step S23), and then sends the pointer to the storage destination back to the MFP 102 (Step S24). Processing of FIG. 7 (operational procedures of the storage server 105 in operation for acquiring time certification) then ends.

The pointer to a storage destination varies depending on the place where the storage server 105 exists. In the event that time certification is performed at the time certification server 104 on an Intranet for example, a storage server which exists on an Intranet is similarly selected as a time stamp storage server. This is based on the assumption that a person who verifies the certified time is restricted to employees in the office, and also the validity as to the time certification server operated in the office is sufficiently reliable as long as he/she is an employee. In this case, let us say that the office server is constructed with a Windows® server, the pointer to the storage destination is "¥¥MYCOMSRV¥TIME¥STAMP¥20040401100325123-003.STP", for example. Though this pointer may be described on a stamp to be printed without any change, a barcode converted from this pointer or a barcode converted from a tag for centrally controlling the pointer, may be described in a stamp to be printed.

In the event that time certification is performed at a time certifying authority on the Internet, a storage server, which exists on the Internet is similarly selected as a time stamp storage server. This is based on the assumption that the time certification by an outsider will be required, and also time certification by a detached and fair organization will be required. In this case, let us say that a time stamp is stored into a web server on the Internet, the pointer to a storage destination is "ftp.xxxx.co.jp/TIME/STAMP/20040404011100325123-003.STP", for example. Though this pointer may be described on a stamp to be printed without any change, a barcode converted from this pointer may be described on a stamp to be printed in the same way as the Intranet. In other words, no matter where the storage server exists, a pointer indicates the location to be stored, so it is sufficient to print the pointer at printout.

Operations for Confirming Time Certification

Next, a description is provided regarding the case in which the user confirms time certification with the MFP 102 following acquisition of time certification. Here, as with printout sheets (paper documents), the printout sheets to which the time stamp designed by the user is appended may be employed, or the printout sheets to which the time stamp created and sent from another person as evidence is appended may be employed.

Figure 8:
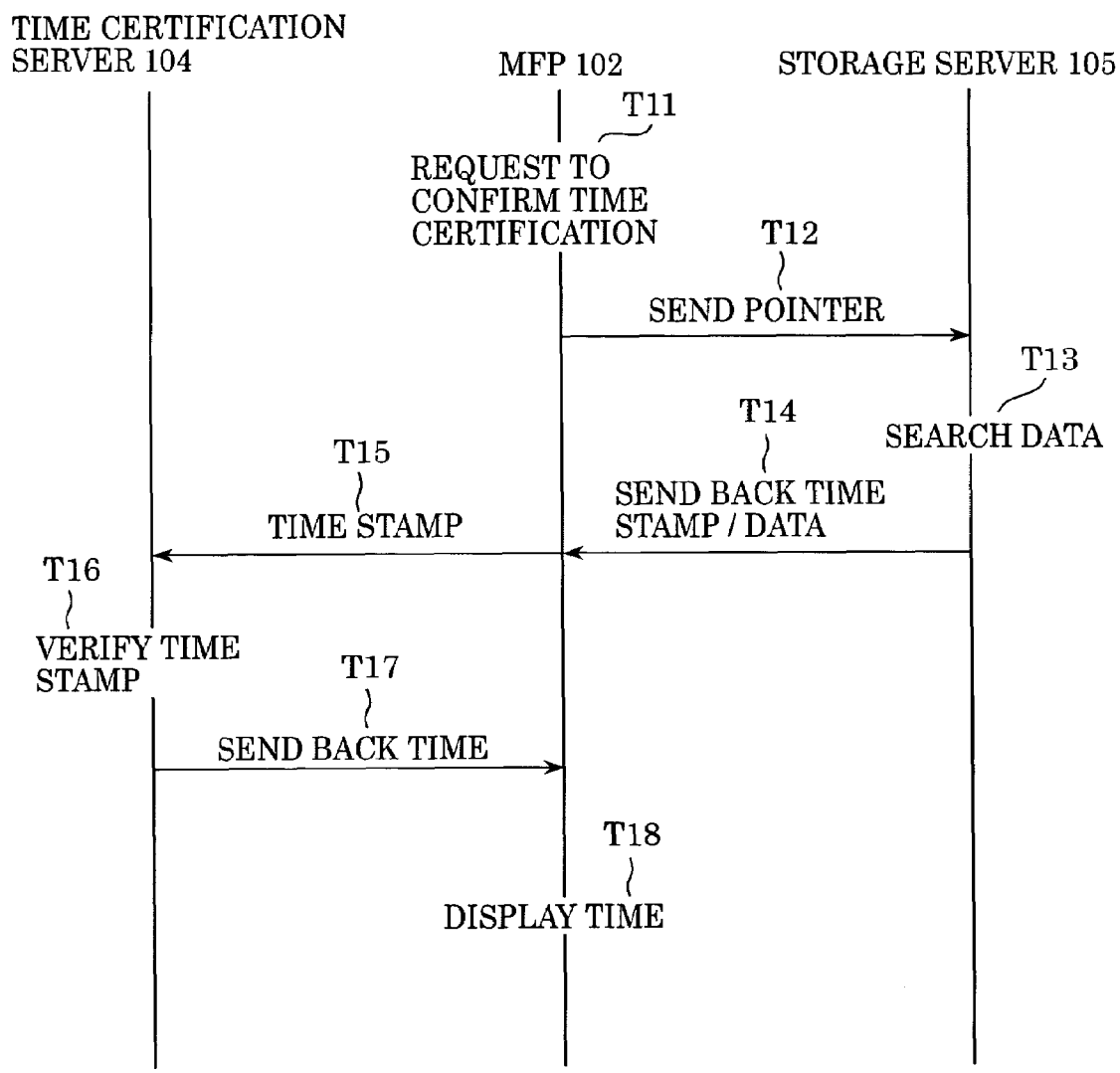
FIG. 8 is a diagram illustrating the data transfer between the time certification server, the MFP, and the storage server in operation for confirming time certification.

FIG. 8 is a diagram illustrating data transfer between the time certification server 104, the MFP 102, and the storage server 105 in operation for confirming time certification. Upon the user requesting time certification confirmation (Step T11), the MFP 102 sends the pointer to the storage destination read out from a printout sheet to the storage server 105 (T12). The storage server 105 searches data based on the pointer to the storage destination (T13), and sends the digital data and time stamp stored therein back to the MFP 102 (T14). The MFP 102 sends the time stamp received from the storage server 105 to the time certification server 104 (T15). The time certification server 104 verifies the time stamp (T16), and sends the verified time back to the MFP 102 (T17). The MFP 102 displays the time received from the time certification server 104 on the operating panel 53 (T18).

Figure 9:
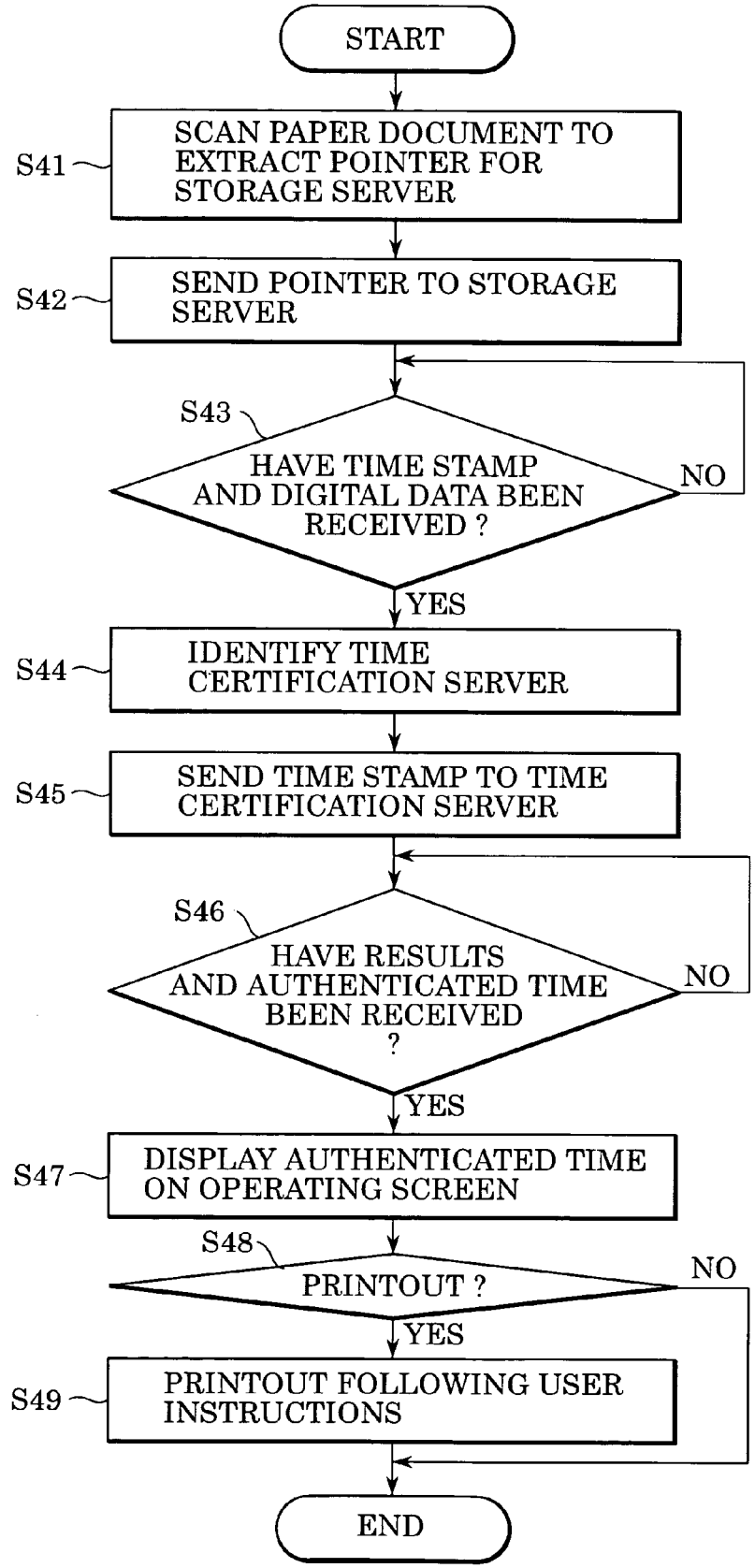
FIG. 9 is a flowchart illustrating the operational procedures of the MFP 102 in operation for confirming time certification.

Individual operations for confirming time certification of the time certification server 104, MFP 102, and storage server 105 are described below. FIG. 9 is a flowchart illustrating operational procedures of the MFP 102 regarding operation for confirming time certification. This processing program is stored in a storage medium (not shown) within the control unit 119. Upon the user setting a paper document on the scanner of the MFP 102 and selecting time certification confirmation function button on the operating panel 53 (see FIG. 13), the processing program is executed by the CPU (not shown) within the MFP 102.

First, upon the user depressing the start button, the MFP 102 scans the paper document set in the scanner unit 113, and controls the time stamp processing unit 118 to extract the pointer to the storage destination from the image data of the paper document (Step S41). The MFP 102 sends the pointer to the storage destination extracted by the time stamp processing unit 118 to the storage server 105 connected to the network 101 through the network interface 112, and then requests the storage server 105 to provide the digital data and time stamp stored in the storage server 105 (Step S42).

The MFP 102 waits for the digital data and time stamp to be received from the storage server 105 connected to the network 101 through the network interface 112 (Step S43), and in response to the reception of the digital data and time stamp, the MFP 102 sends these to the time stamp processing unit 118. The time stamp processing unit 118 analyzes the time stamp, and then identifies which time certification server has received this time certification (Step S44). Furthermore, the time stamp processing unit 118 sends the time stamp to the identified time certification server 104 through the network interface 112 and the network 101 so as to request the time certification server 104 to confirm time certification (Step S45).

Subsequently, the MFP 102 waits the time stamp processing unit 118 to receive the results confirmed by the time certification server 104 from the network interface 112 via the network 101 (Step S46). In response to the reception of the results confirmed by the time certification server 104, the time stamp processing unit 118 displays the time certified by the time certification server 104 on the display screen of the operating panel 53 based on the results, and also displays a screen (see FIG. 17) for inquiring of the user on the operating panel regarding whether or not the results should be printed (Step S47).

The time stamp processing unit 118 determines whether or not the user has instructed to print the confirmation results of the time certified by the time certification server 104 on the display screen on the operating panel (Step S48). If the user has instructed printout, the time stamp processing unit 118 sends the digital data received from the storage server 105 to the image formation unit 117, and then the image formation unit 117 performs printout in accordance with the printout format specified by the user, i.e., performs printout of only the confirmation results of the certified time, or printout synthesizing the digital data and time certified by the time certification server 104 (Step S49). Processing of FIG. 9 (operational procedures of the MFP 102 regarding operation for confirming time certification) then ends.

Figure 10:
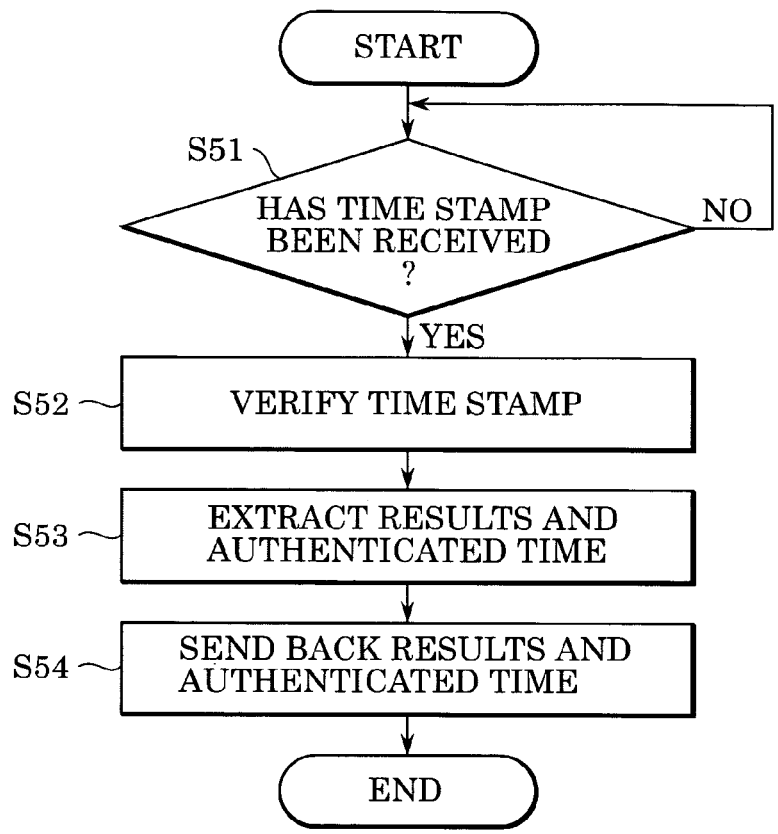
FIG. 10 is a flowchart illustrating the operational procedures of the time certification server 104 in operation for confirming time certification.

FIG. 10 is a flowchart illustrating operational procedures of the time certification server 104 in operation for confirming time certification. This processing program is stored in the hard disk 137 serving as a storage medium within the time certification server 104, and is executed by the CPU 131 within the time certification server 104.

The time certification server 104 waits for receipt of the confirmation request for time certification, i.e., the reception of the time stamp (Step S51). In response to receiving the confirmation request for time certification, the time certification server 104 decrypts the digital signature included in the time stamp with the secret key possessed by the time certification server 104 alone, and determines whether or not there has been tampering (verification of time stamp) (Step S52). The time certification server 104 extracts time information filled in the time stamp (Step S53), and then sends these results back to the MFP 102 (Step S54). Processing of FIG. 10 (operational procedures of the time certification server 104 in operation for confirming time certification) then ends. As for the protocol of this certification confirmation sequence, the protocol specified by the time certification server is employed. In general, this protocol is standardized, and acquisition of the time stamp is performed in accordance with this protocol.

Figure 11:
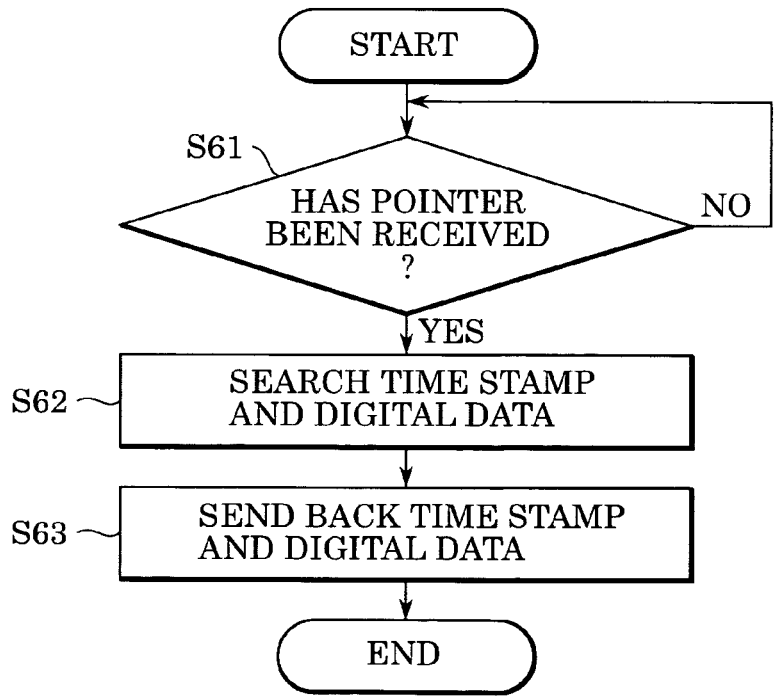
FIG. 11 is a flowchart illustrating the operational procedures of the storage server 105 in operation for confirming time certification.

FIG. 11 is a flowchart illustrating operational procedures of the storage server 105 in operation for confirming time certification. This processing program is stored in a storage medium (not shown) within the storage server 105, and is executed by the CPU (not shown) within the storage server 105.

The storage server 105 determines whether or not the storage server 105 has received the pointer to the storage destination from the MFP 102 connected to the network 101, i.e., whether or not the digital data and time stamp stored in the storage server 105 have been requested (Step S61). If the pointer to the storage destination has not been received, the processing in Step S61 is repeated until the pointer is received.

If the pointer to the storage destination has been received (yes in Step S61), the storage server 105 searches the digital data and time stamp corresponding to the received pointer to the storage destination (Step S62). As a result of this search, the storage server 105 sends the corresponding digital data and time stamp back to the MFP 102 (Step S63). Processing of FIG. 11 (operational procedures of the storage server 105 in operation for confirming time certification) then ends.

User Interface Screen

Figure 13:
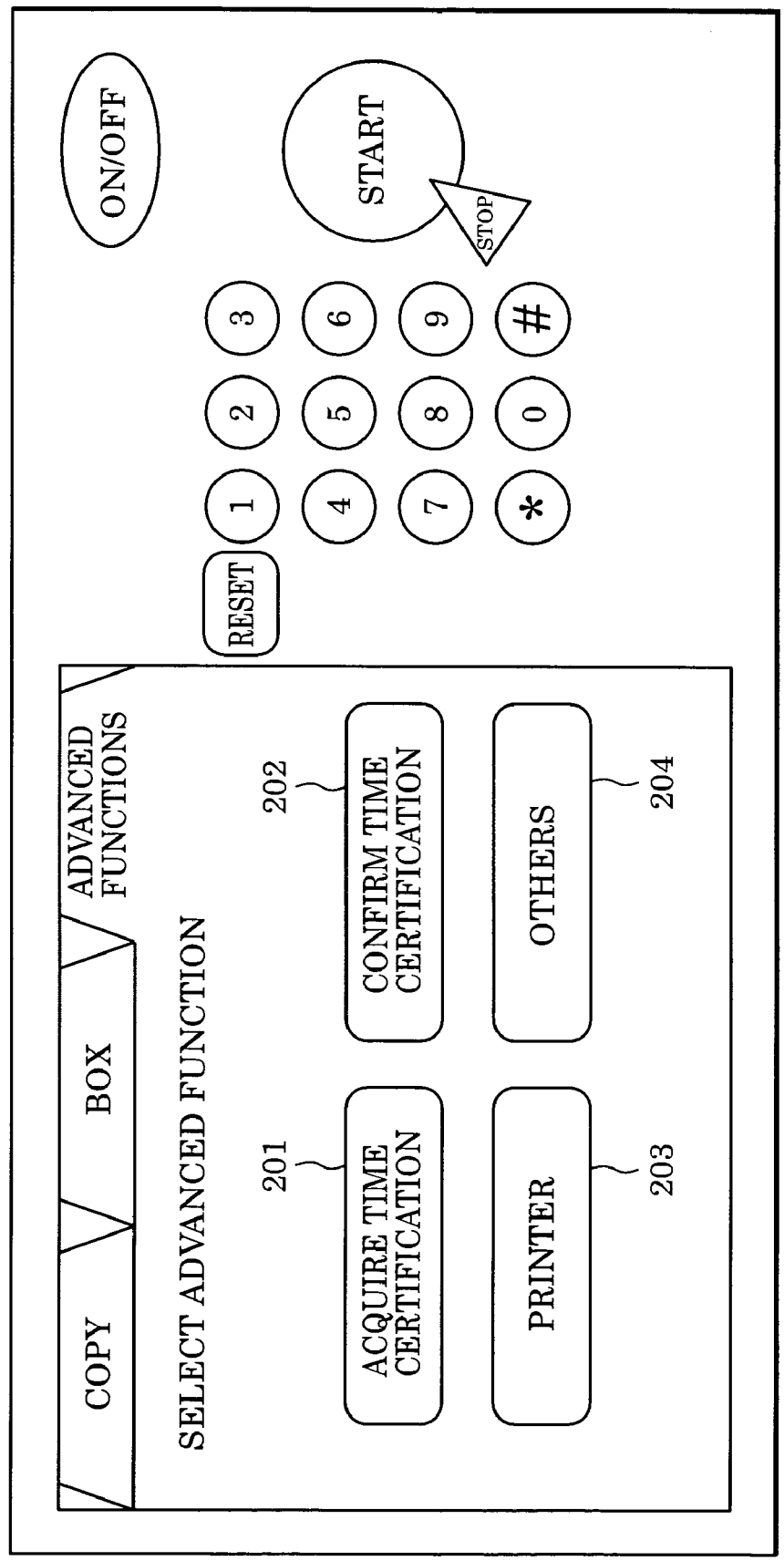
FIG. 13 is a diagram illustrating an operating panel for selecting the functions of the MFP.

FIG. 13 is a diagram illustrating the operating panel 53 at the time of selecting the functions of the MFP 102. The exemplary user interface shown in FIG. 13 includes three tabs of "COPY", "BOX", and "ADVANCED FUNCTIONS". As shown in FIG. 13, the display screen of the operating panel 53 includes "ACQUIRE TIME CERTIFICATION" 201, "CONFIRM TIME CERTIFICATION" 202, "PRINTER" 203, and "OTHERS" 204 function buttons on the "ADVANCED FUNCTIONS" tab. For example, upon the user setting a paper document in the scanner of the MFP 102 and selecting the "ACQUIRE TIME CERTIFICATION" function button 201 on the operating panel 53, operation for acquiring time certification starts.

Figure 14:
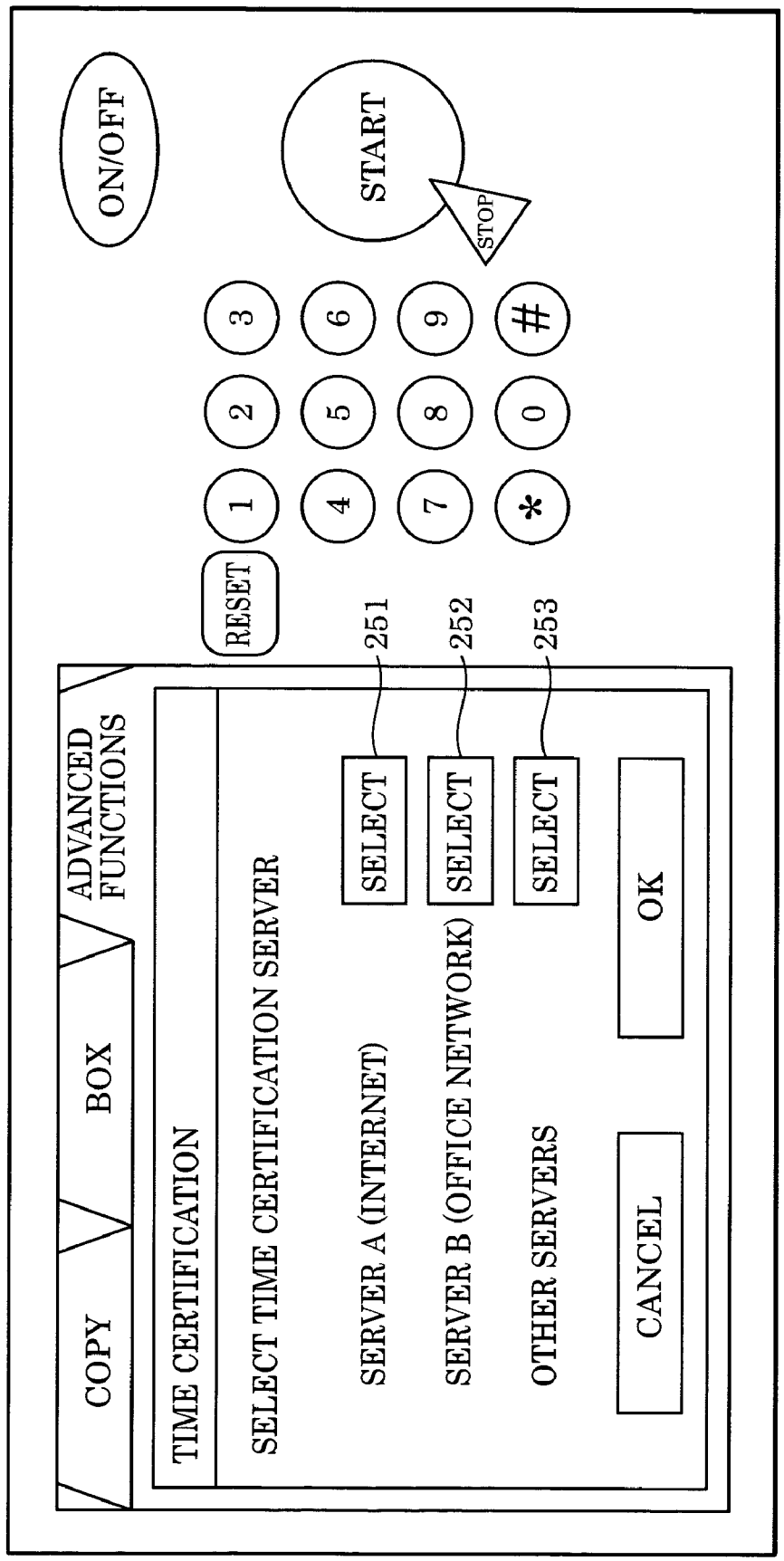
FIG. 14 is a diagram illustrating the operating panel at the time of selecting from multiple time certifying authorities.

FIG. 14 is a diagram illustrating the operating panel at the time of selecting from multiple time certifying authorities. Selection buttons 251 through 253 are provided on this screen of the operating panel for selecting from multiple time certifying authorities. In FIG. 14, selection button 251 is for selecting a time certification server, which exists on the Internet and is registered, selection button 252 is for selecting a time certification server, which exists on an Intranet (in-office network) and is registered, and selection button 253 is for selecting an unregistered time certification server.

There are many time certifying authorities on the Internet, and they compete in service content. Though any time certifying authority can be connected with the MFP 102, in general, one through several time certifying authorities of which accounts are possessed are employed as a matter of payment.

The selection button 251 for selecting a time certifying authority on the Internet is displayed at the ease-of-select position on the display screen on the operating panel 53. In the event that a time certification server is provided in the corporation such that it is available only in the corporation, so that certification costs for a time certifying authority are cut back, the selection button 252 is provided for selecting this in-office time certification server. As for other time certifying authorities, the selection button 253 is provided for selecting other servers. Note that, regarding servers not displayed on the screen as a selection alternative, in exemplary embodiments, the address or name thereof may be input from the keyboard.

Figure 15:
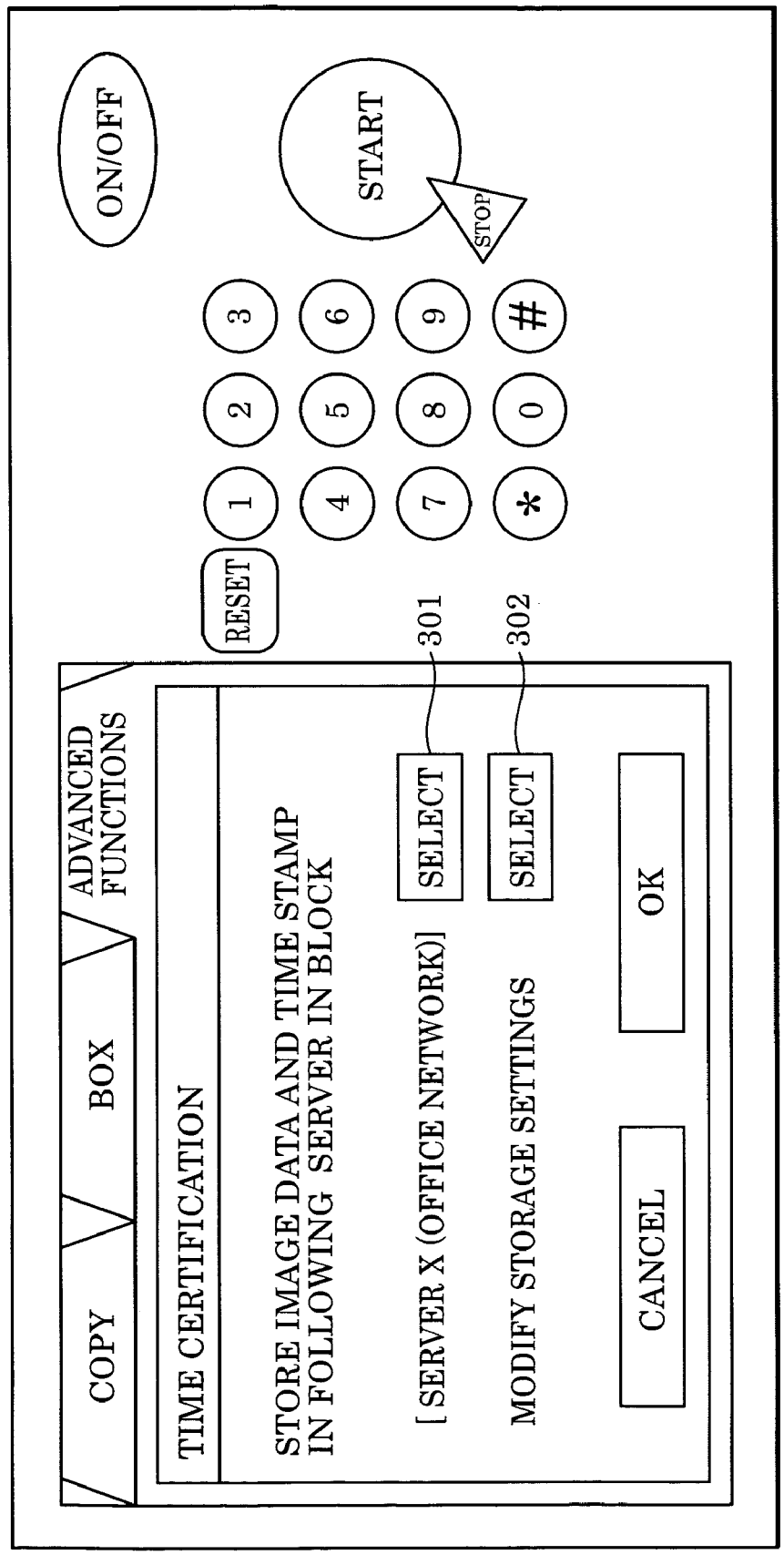
FIG. 15 is a diagram illustrating the operating panel at the time of storing image data and the time stamp thereof in block.

FIG. 15 is a diagram illustrating the operating panel 53 at the time of storing image data and the time stamp thereof in block. A selection button 301 for selecting a storage server, and a selection button 302 for modifying settings of storage are provided on the operating panel 53. Optional settings in the event that the image data generated by scanning a paper document and the time stamp sent from the time certification server 104 are stored in block can be performed here.

As for the selection alternatives of this option, settings can be performed regarding whether or not the image data is stored and whether or not the time stamp is stored. If the image data and the time stamp are stored, selections can be made regarding whether they are stored separately or together, and further, which storage destination is to be employed. In general, a time stamp is stored in order to let the time certification server confirm whether or not the time stamp is a genuine time stamp at a future date. Generally, image data and the time stamp thereof are stored together in order to clarify which image data corresponds to the time stamp. Accordingly, setting items are displayed at a position where such a selection alternative, which is generally used, is readily selectable.

It is appropriate to have a dedicated storage destination corresponding to each time certification server. For example, in the event that certification has been received at a time certifying authority on the Internet, it is assumed that the certification is sent to an outsider so as to let this outsider confirm the certification. Accordingly, in this case, a storage destination preferably exists on the Internet. For example, in the event that data storage service is provided on the Internet, it is preferable to store time stamp data to a storage destination on the Internet. In the event that certification has been received at a time certification server over an in-office network (Intranet), it is assumed that the certification is sent to only an employee so as to let him/her confirm the certification in order to reduce costs. Accordingly, in this case, a storage destination preferably exists on this Intranet. As described above, in the event that a storage server is selected on the operating panel (see FIG. 15), the display is dynamically changed to correspond to the selected time certification server.

In the event that the user wants to change the default settings registered beforehand, a user interface screen capable of changing image data, time stamp, and storage destination, is displayed by selecting the selection button 302 for changing settings.

Figure 16:
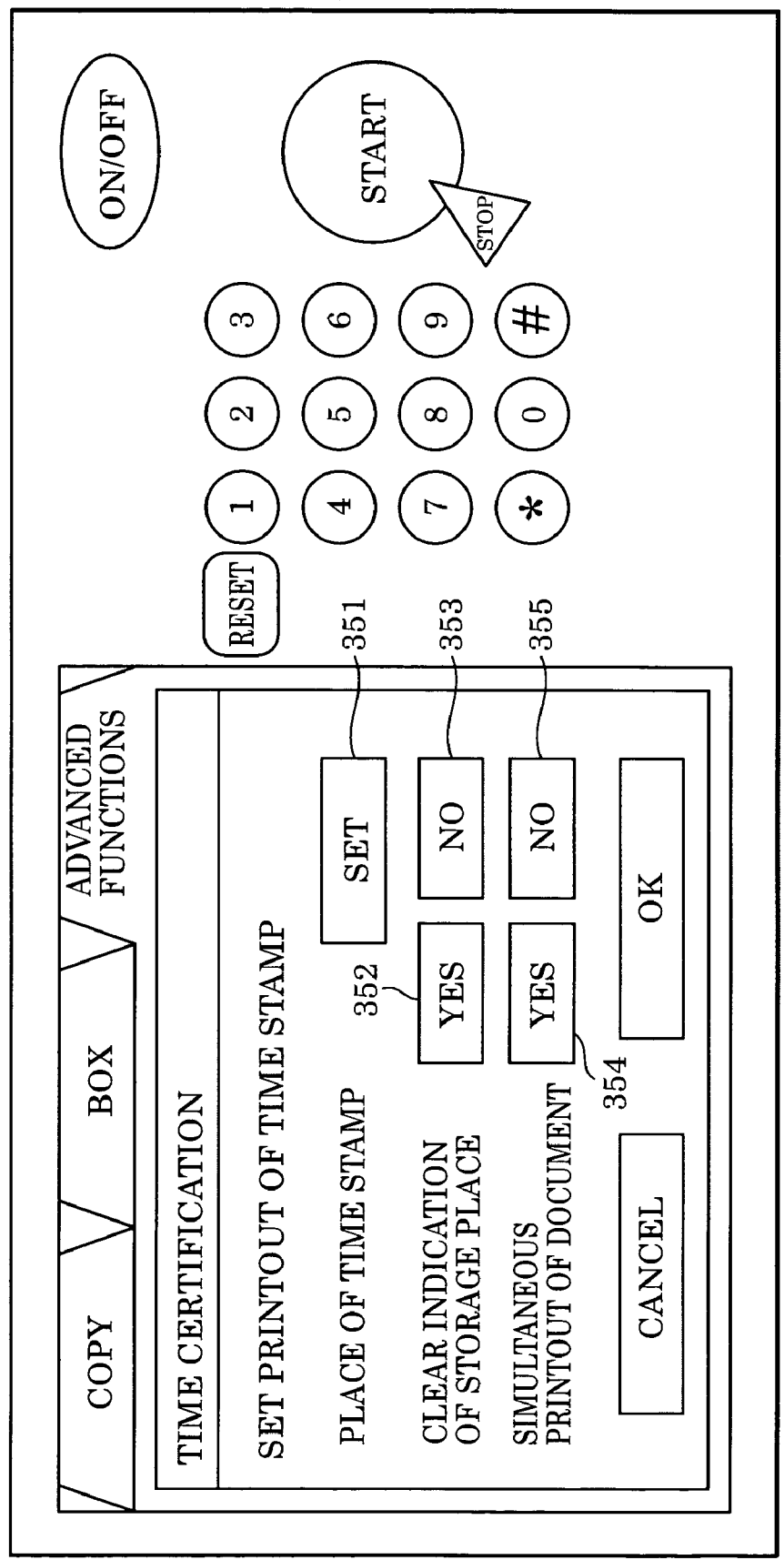
FIG. 16 is a diagram illustrating the operating panel at the time of performing settings for printout of time stamps.

FIG. 16 is a diagram illustrating the operating panel 53 at the time of setting printout of a time stamp. On this display screen on the operating panel 53, a setting button 351 for setting a place for a time stamp, i.e., which portion of a printout sheet this time stamp is synthesized with, a "YES" button 352 and "NO" button 353 for setting whether or not to make explicit indication of a storage place, i.e., whether or not a pointer to the storage place of a time stamp is to be printed, and a "YES" button 354 and "NO" button 355 for setting whether or not to make simultaneous printout of documents, i.e., whether or not a scanned document is to be copied without change so as to print the original document in addition to the document on which the original document is synthesized with a time stamp are provided.

For example, upon the setting button 351 for setting the position of a time stamp being depressed, a screen for specifying the position is displayed on the upper left, upper right, lower left, lower right, center of the display, or the like. Note that in a state where a scanned image is displayed on the display screen of the operating panel, a position may be specified using an attached stylus pen, or a screen to specify a detailed position such as a point a certain distance (e.g., millimeters) above and below the corner of an output sheet may be displayed. Upon the user depressing the start button following setting on such an operating panel, the MFP 102 scans the paper document set in the scanner, and performs image processing and time certification processing, as described above.

Figure 17:
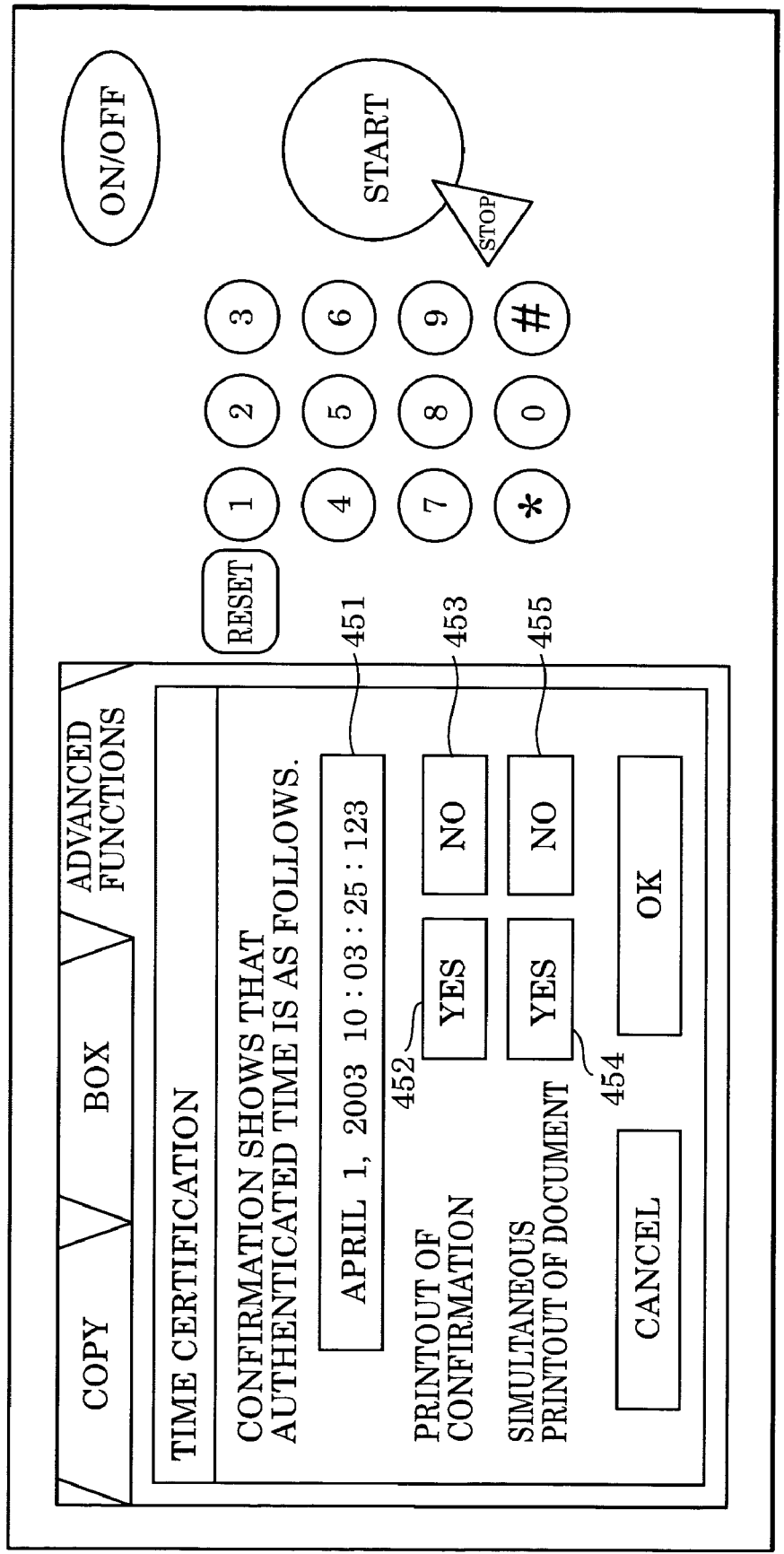
FIG. 17 is a diagram illustrating the operating panel at the time of confirming time certification.

FIG. 17 is a diagram illustrating the operating panel 53 at the time of printing confirmed results of time certification. Upon the user setting printout sheets on which a time stamp is appended in the scanner of the MFP 102, selecting a "TIME CERTIFICATION CONFIRMATION" function button 202 (FIG. 13) on the operating panel under the "ADVANCED FUNCTIONS" tab, and depressing the start button, the MFP 102 scans the paper document set in the scanner, and performs image processing and time certification confirmation processing. The MFP 102 extracts a suitable time stamp based on the pointer to the storage destination printed on the printout sheets, requests the suitable time certification server to confirm the time stamp, and then obtains a response. Subsequently, the MFP 102 displays the certified time from the response on the display screen on the operating panel 53. Furthermore, the MFP 102 displays a screen for inquiring of the user whether or not the confirmed results are printed, i.e., a "YES" button 452 and "NO" button 453 for setting confirmation of printout. Furthermore, the MFP 102 displays a screen for inquiring of the user whether or not the certified image data stored in the storage server 105 is simultaneously printed, i.e., a "YES" button 454 and "NO" button 455 for setting simultaneous printout of documents. The user performs the above-described operations, and the user can obtain the certified time and digital data as to the printout sheets with the time stamp, and, can confirm the printout of which time is certified.

As described above, according to the time certification system of the present embodiment, time certification can be readily performed for a handwritten memo by employing the MFP 102. Accordingly, a service can be provided for giving proof that a memo on which some idea was handwritten had existed at that time, and tampering has not been conducted on that memo. Accordingly, with the present embodiment, time certification of paper documents can be performed easily, and also confirmation thereof can be performed easily. In addition to affixation of a time stamp on paper documents, verification can be performed regarding whether or not the time stamp affixed on the paper document in hand is correct.

Generally speaking, these advantages result in the following. For example, if the generated data exists now, and the third party certifies this time, this third party who certifies this time is a so-called time certifying authority. This time certifying authority performs service for affixing time data (time stamp) based on time counted by a precise clock, and certifying the time data (time stamp). Accordingly, since the time certifying authority has functions to satisfy standard specifications, and the time stamp thereof is generally recognized as a correct stamp, both the person who makes a request to affix a time stamp and the person who confirms the affixed time stamp can trust this time certifying authority, and accordingly, the time stamp is thereof trusted. However, it is assumed that requesting the time certifying authority to affix the time stamp, and also requesting the time certifying authority to confirm the affixed time stamp are usually performed on a PC (personal computer). Accordingly, in the event that order content is handwritten on an order sheet, affixed with a corporate seal, and the order sheet is sent to a business partner with a facsimile device, it is not so easy to certify that the handwritten order sheet existed at that time. In the event that some idea is conceived, and handwritten on paper, it is not so easy to certify that this idea existed at that time. In this case, the assumed procedures are as follows. First, the user reads a paper document with a scanner so as to digitize the document, calculates the hash value of the digital data thereof with a PC, selects the time certifying authority from which the user want to obtain time certification, sends the hash value to the time certifying authority, receives the time stamp which is created by the time certifying authority, and then manages the digital data of the paper document and the received time stamp. Furthermore, in the event that the time stamp is confirmed at the time certifying authority, the user sends the time stamp to the time certifying authority, receives the results confirmed by the time certifying authority, and then displays the received results on the PC screen. Time certification and confirmation thereof are performed with the above-described procedures.

Though a PC may be employed as described above, operational procedures are complex. With the present embodiment, employing an MFP instead of a PC enables operations for time certification of paper documents and operations for confirmation to be simplified.

Description has been made regarding the present embodiment of the present invention, however, the present invention is not restricted to these configurations according to the present embodiment, and the present invention may be applied to any configuration as long as the functions shown in the spirit and scope of the appended claims, or the functions according to the present embodiment can be achieved.

For example, an MFP includes functions such as facsimile reception, Box function, IPP (Internet Printing Protocol) and the like, which enables the MFP to receive data from an external device, and retain the received data as digital data, and then print out the data. With these functions, the received digital data may be subjected to time certification.

With the MFP, the received data is converted into digital data, and is retained, so the operational procedures for requesting the time certification server 104 to perform time certification are the same procedures as the above-described procedures. However, only the timing for instructing time certification is different from that in the above-described procedures. In the event that time certification is performed by scanning a paper sheet, operations by the user are introduced, so time certification should be performed in that timing. On the other hand, facsimile reception, reception with Box functions, and IPP reception are automatically performed, so operations by the user are not introduced at the time of reception of these jobs. Accordingly, in this case, instructions as to time certification need to be performed by setting operation at the time of reception of these jobs beforehand.

Figure 18:
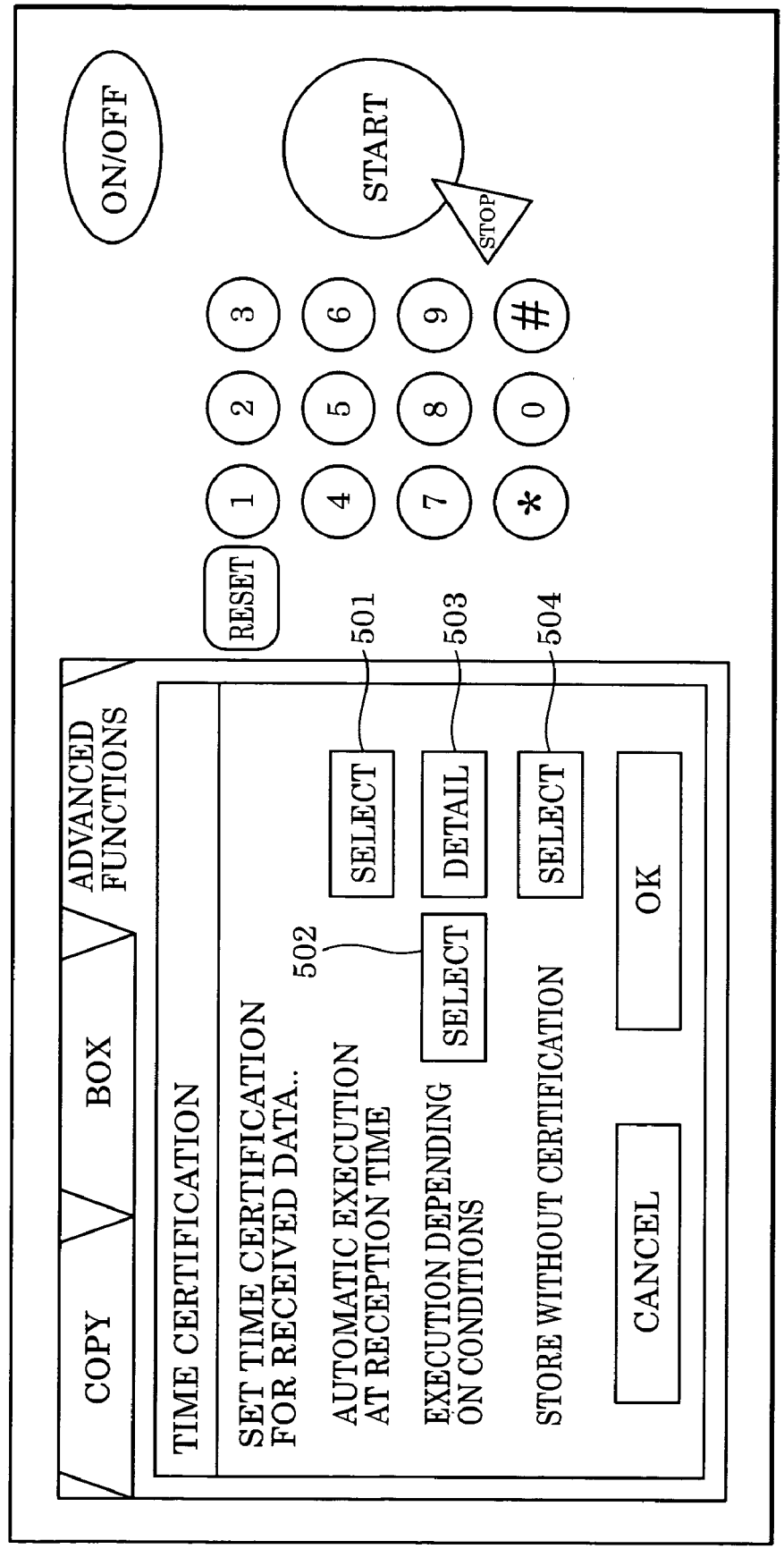
FIG. 18 is a diagram illustrating the operating panel at the time of performing settings for operations of receiving a job.

FIG. 18 is a diagram illustrating the operating panel 53 at the time of setting operation at the time of reception of these jobs. Corresponding to the reception of a job, an "AUTOMATIC EXECUTION AT RECEPTION TIME" selection button 501 for automatically instructing all jobs to perform time certification, an "EXECUTION DEPENDING ON CONDITIONS" selection button 502 for instructing only the job which matches conditions to perform time certification, and a "DETAIL" button 503 for instructing these conditions in detail are provided. In addition, a "STORAGE WITHOUT CERTIFICATION" selection button 504 for instructing all jobs to store the received data without performing time certification is provided.

The received data is subjected to time certification in accordance with the mode selected on this setting screen. The digital data, which was not subjected to time certification, is stored in the MFP 102, so time certification can be executed as necessary. The operational procedures for verifying time certification are also the same procedures as the above-described procedures. Thus, the present invention meets not only needs for the digital data to be sent, but also needs for the received data regarding time certification, and a time stamp can readily be affixed on the received data. Furthermore, confirmation thereof can be easily performed as well.

With the above-described embodiment, while the time certification server 104 and the storage server 105 have been provided separately on the Internet, a server including the functions of the time certification server 104 and the storage server 105 (hereinafter, referred to as time certifying archiver) may be employed. In this case, the MFP 102 scans a handwritten memo, digitizes it so as to obtain a hash value, sends the hash value to the time certifying archiver so as to request time certification and storage, and receives the pointer to the storage destination from the time certifying archiver so as to affix it on the memo. The person who wants to confirm the validity of the memo sends the pointer to the time certifying archiver so as to request confirmation. The operation for acquiring and confirming time certification is the same operation as the above-described operation.

Furthermore, with the above-described embodiment, while the data to be sent to the time certification server 104 from the MFP 102 has been a hash value at the time of performing time certification, any data may be employed. Digital data itself may be sent provided that the identity of the digital data obtained by scanning a paper document is secured. In this case, the time certification server may calculate a hash value from digital data. Paper documents, text documents, photographs, drawings, and the like may be employed, which are not restricted to any particular document.

With the above-described embodiment, while image data generated by scanning a paper document has been employed, in the event that the MFP 102 has a function such as OCR (Optical Character Reader) or the like for converting into code data, code data converted from this image data may be treated as digital data, and in this case, the hash value of the converted code data may be sent to the time certification server. In the event that the MFP has a large-capacity data storage device, the MFP itself may store time stamps and digital data instead of the storage server.

According to the present invention, digital data is generated by reading a document, time certification of the generated digital data is requested, and time information at which time certification is performed according to this request is acquired. This acquired time information and the digital data corresponding to the time information are stored, so that time certification of a paper document and confirmation thereof can easily be performed.

An embodiment of a data storage device and a data storing method according to the present invention are described next with reference to the drawings.

Configuration of Storage Server

Figure 19:
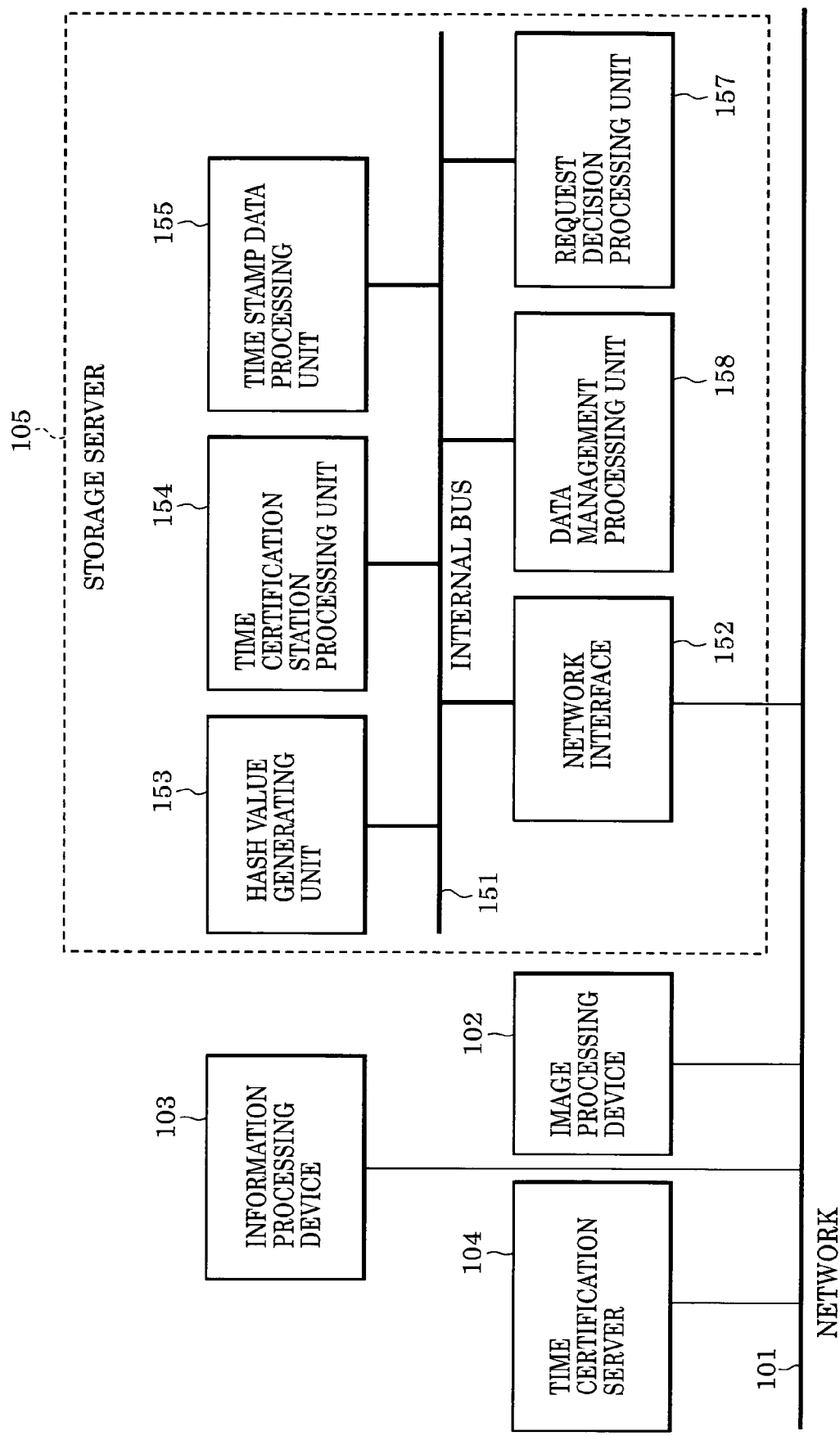
FIG. 19 is a diagram illustrating the configuration of the storage server.

FIG. 19 is a diagram illustrating the configuration of the storage server 105. The storage server 105 includes a network interface 152, a hash value generating unit 153, a time certifying authority processing unit 154, a time stamp data processing unit 155, a request decision processing unit 157, and a data management processing unit 158 connected to an internal bus 151.

With the storage server 105 having such a configuration, upon the user giving instructions from the information processing device 103, the instructions are sent to the data management processing unit 158 of the storage server 105 via the network 101. Thus, the storage server 105 starts the time certification of the instructed digital data.

First, the storage server 105 generates a hash value of the digital data managed by the data management processing unit 158 with a one-way function by the hash value generating unit 153. In exemplary embodiments, the one-way function and parameters thereof are prepared beforehand by the time certifying authority processing unit 154 performing negotiation with the time certification server 104 via the network 101, recognizing the one-way function and parameters thereof specified by the time certification server 104, and storing the information in the time certification processing unit 154 beforehand. The hash value generating unit 153 generates a hash value with this information.

Any time certification server may be employed. In general, a time certification server in cooperation with or under contract with the storage server 105 is employed from the perspective of operational advantages. In the event of several time certification servers in cooperation with or under contract with the storage server 105, an arrangement may be made in which the selection alternatives are displayed for the user, and a time certification server is determined in accordance with the user selection. Upon the time certification server being determined, the one-way function and parameters thereof are uniquely determined. In this case, the time certifying authority processing unit 154 manages multiple time certification servers.

Following generation of a hash value, the storage server 105 sends the generated hash value to the time certification server 104 via the network 101 so as to request time certification. The time certification server 104 includes a clock keeping precise time, and acquires precise time therefrom. The time certification server 104, in response to the reception of the hash value sent from the storage server 105, generates a digital signature as to the time information and the received hash value with the secret key possessed by the time certification server 104, and sends this back to the storage server 105 as a time stamp.

Note that the protocol specified by the time certification server is employed as the protocol of this time certification sequence. In general, this protocol is standardized, and a time stamp is acquired in accordance with this protocol. This sequence is the same either in the case of time certification on the Internet or in the case of time certification on an Intranet.

Figure 20:
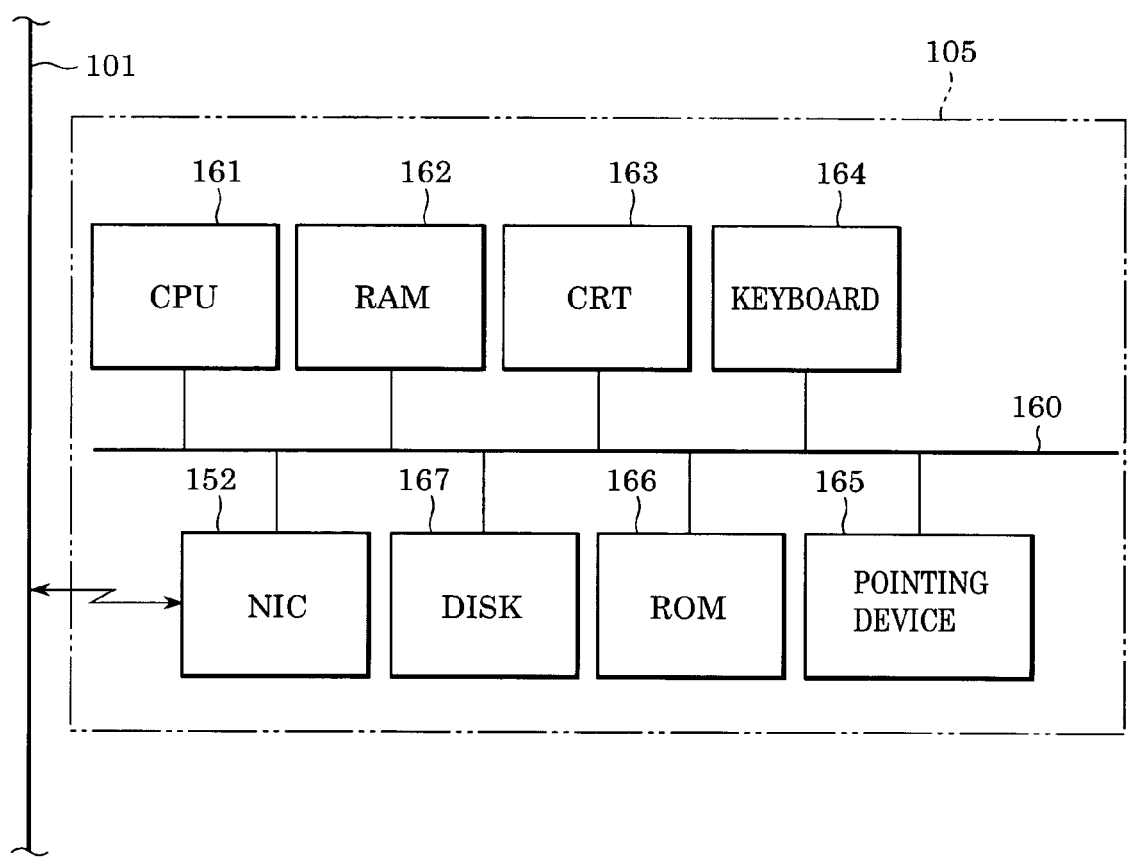
FIG. 20 is a diagram illustrating the electric configuration of the MFP and the storage server connected via a network.

FIG. 20 is a diagram illustrating the electric configuration of the storage server 105 connected via the network 101. There is a difference between the configuration of the storage server 105 and that of the time certification server 104 and the information processing device 103, in that the storage server 105 has a large capacity storage device capable of storing a great deal of image data. On the other hand, the time certification server 104 differs in configuration from that of the storage server 105 and that of the information processing device 103, in that the time certification server 104 includes a clock unit keeping precise time.

The storage server 105 has a configuration wherein a CPU 161, RAM 162, a display device, such as a CRT 163, a keyboard 164, a pointing device 165, ROM 166, a hard disk (DISK) 167, and a NIC 152 are mutually connected via a system bus 160. Here, the hard disk 167 is included in the data management processing unit 158. A program controlling the storage server 105 is stored in the hard disk (DISK) 167 serving as a storage medium, which is read into the RAM 162 as necessary, and is executed by the CPU 161. Each unit in FIG. 19 is realized by the CPU 161 executing the control program stored in the hard disk 167. The CPU 161 displays various information on the CRT 163, and receives instructions of the user through the keyboard 164 or pointing device 165. Additionally, the CPU 161 communicates with the external information processing device 103, time certification server 104, MFP 102, or the like through the NIC 152 and the network 101.

Internal Operation of Storage Server at Acquisition of Time Certification

Figure 21:
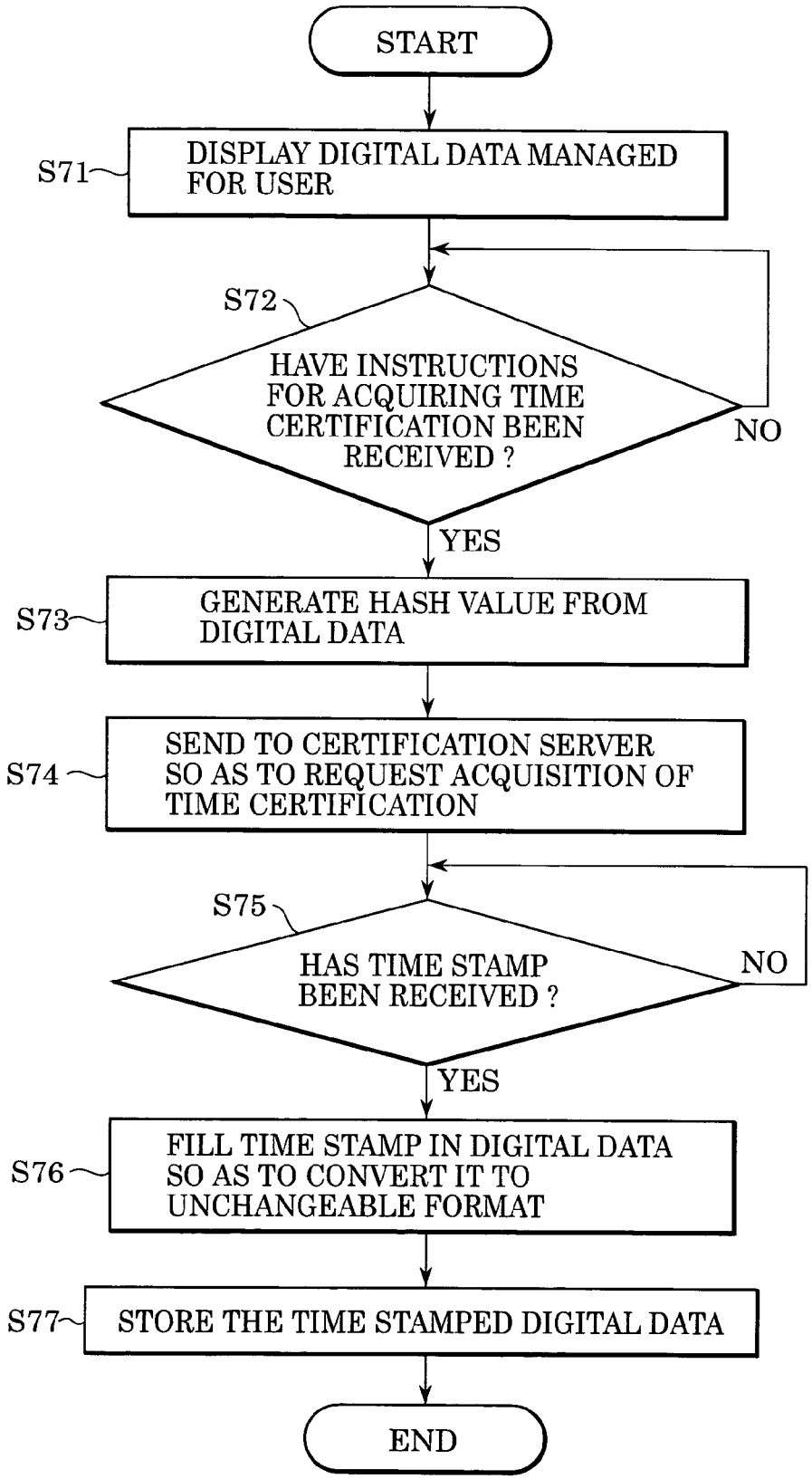
FIG. 21 is a flowchart illustrating the operational procedures of the storage server at the time of acquiring time certification.

FIG. 21 is a flowchart illustrating operational procedures of the storage server 105 at the time of acquiring time certification. This processing program is stored in the hard disk 167 within the storage server 105, and is executed by the CPU 161. First, image data (digital data) stored in the hard disk 167, which is managed by the data management processing unit 158, is read out, and is displayed on the user information processing device 103 via the network interface 152 and the network 101 (Step S71).

Digital data is selected by the user, and whether or not time certification thereof has been instructed is determined (Step S72). If time certification thereof has not been instructed, the processing in Step S72 is repeated. On the other hand, if time certification has been instructed by the user, the instructions are sent to the data management processing unit 158 of the storage server 105 via the network 101. Thus, the storage server 105 starts the time certification processing of the digital data.

First, in Step S73, the storage server 105 generates a hash value of the digital data managed by the data management processing unit 158 with a one-way function by the hash value generating unit 153. In exemplary embodiments, the one-way function and parameters thereof employed are prepared beforehand by the time certifying authority processing unit 154 performing negotiation with the time certification server 104 via the network 101, recognizing the one-way function and parameters thereof specified by the time certification server 104, and storing the information in the time certification processing unit 154 beforehand. The hash value generating unit 153 generates a hash value with this information.

Any time certification server may be employed. In general, a time certification server in cooperation with or under contract with the storage server 105 is employed from the perspective of operational advantages. In the case of several time certification servers in cooperation with or under contract with the storage server 105, an arrangement may be made in which the selection alternatives are displayed for the user, and a time certification server is determined in accordance with the user selection. Upon the time certification server to be employed being determined, the one-way function and parameters thereof to be employed are uniquely determined. In this case, the time certifying authority processing unit 154 manages multiple time certification servers.

Following generation of a hash value, the storage server 105 sends the generated hash value to the time certification server 104 via the network 101 so as to request acquisition of time certification (Step S74). The storage server 105 waits until the network interface 152 receives the time stamp sent from the time certification server 104 via the network 101 (Step S75). Upon the time stamp being received, the received time stamp is sent to the data management processing unit 158 within the storage server 105, the data management processing unit 158 manages the digital data subjected to time certification and the time stamp thereof so as to correlate the digital data with the time stamp thereof (Step S76), and then stores the time stamped digital data in the hard disk 167 (Step S77). Processing of FIG. 21 (operational procedures of the storage server 105 at the time of acquiring time certification) then ends.

Various methods can be conceived for a specific method in which the data management processing unit 158 manages the digital data subjected to time certification and the time stamp thereof so as to correlate the digital data with the time stamp thereof. Examples include: a method in which one folder is prepared for each digital data, digital data and the time stamp thereof for making up a pair are stored therein; a method in which digital data and the time stamp thereof for making up a pair are identified by data made up of a markup language, such as the XML, or the like; and a method of managing a pair of digital data and the time stamp thereof in which digital data and the time stamp thereof are combined into one digital data, and then this digital data is converted into data including an attribute that cannot be edited.

For example, management by means of the Acrobat® time certification plug-in, which is an application created by Adobe® Corporation, is known. In the event of employing this plug-in, the time stamp data processing unit 155 converts the digital data managed by the data management processing unit 158 into PDF data. Subsequently, the time stamp sent from the time certification server 104, and stored in the data management processing unit 158, is sent to the time stamp data processing unit 155. The time stamp data processing unit 155 fills the time stamp in the PDF data. Furthermore, this PDF data is converted into the PDF data including an attribute that cannot be edited with the Acrobats encryption function. Employing this method without any change enables a management method of digital data that is filled with time stamps and is not able to be changed to be obtained.

For a specific example, let us say that digital data subjected to time certification "2002.09.21_meeting_memo.doc" and the time stamp thereof "2002.09.21_meeting_memo.tms" exist. The PDF data "2002.09.21_meeting_memo.pdf" is obtained by converting the digital data "2002.09.21_meeting_memo.doc" into a PDF file, and filling the time stamp in the PDF file. This PDF data indicates the content of the file subjected to time certification, and also includes the time stamp; time certification can be verified with this PDF data alone.

If time certification is performed, the storage server 105 stores three files at the time of storing a file: the digital data file itself, the time stamp thereof, and a file in which the digital data and the time stamp thereof are integrated and which cannot be edited. These files are managed by the data management processing unit 158.

Figure 22:
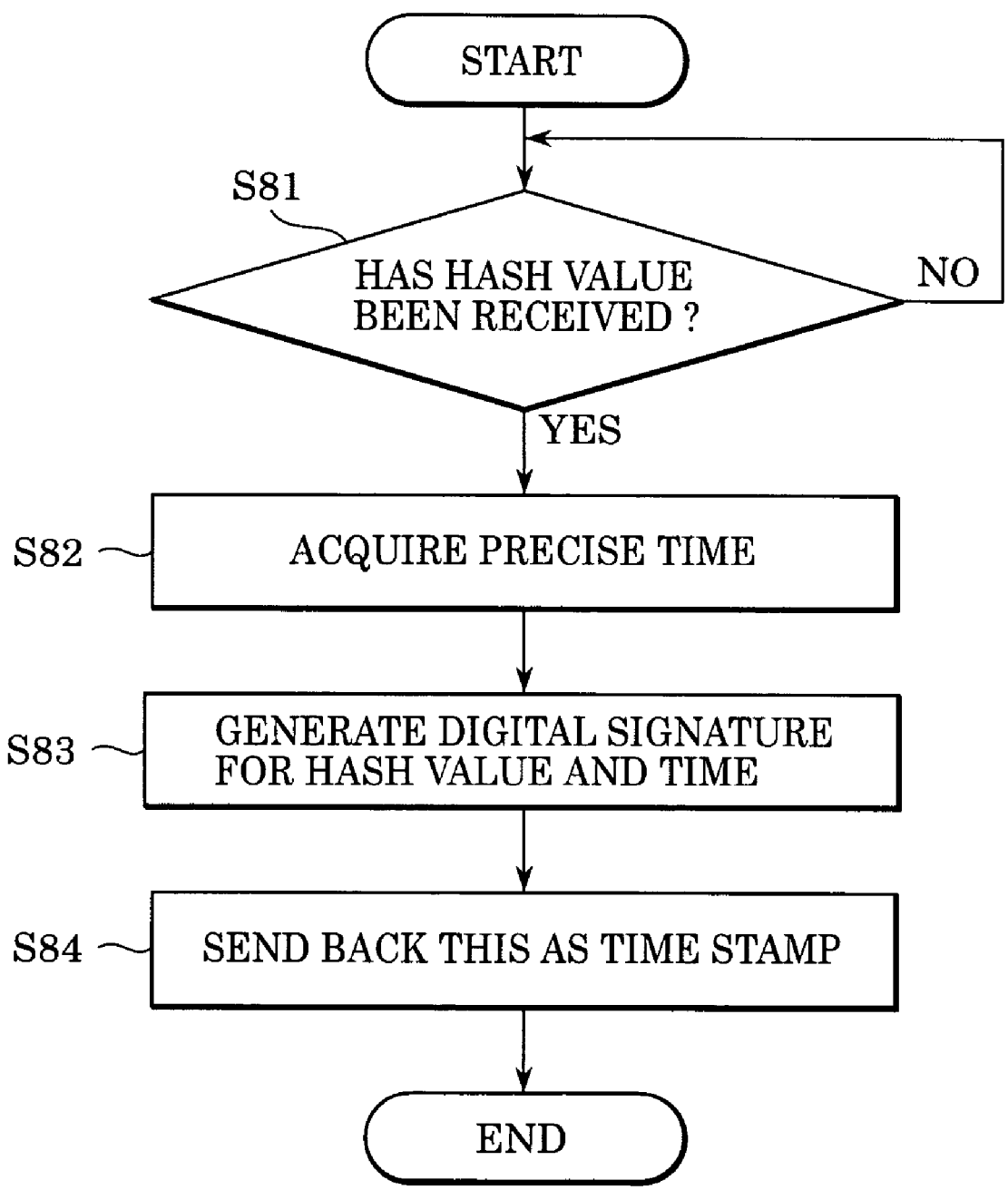
FIG. 22 is a flowchart illustrating the operational procedures of the time certification server at the time of acquiring time certification.

FIG. 22 is a flowchart illustrating operational procedures of the time certification server 104 at the time of acquiring time certification. This processing program is stored in the storing medium within the time certification server 104, and is executed by the CPU (not shown). As described above, the time certification server 104 includes a clock keeping precise time, and is able to obtain precise time therefrom.

First, the time certification server 104 awaits the reception of the hash value sent from the storage server 105 (Step S81). In response to the reception of the hash value, the time certification server 104 acquires the precise time information at that time (Step S82). Subsequently, the time certification server 104 generates a digital signature as to the time information at that time and the hash value which is sent with the secret key possessed by the time certification server 104 (Step S83), sends the digital signature back to the storage server 105 as a time stamp (Step S84). Processing of FIG. 22 (operational procedures of the time certification server 104 at the time of acquiring time certification) then ends.

In exemplary embodiments, the protocol to be used for this certification sequence is the protocol specified by the time certification server. In general, this protocol is standardized, and a time stamp is acquired in accordance with this protocol. This sequence is the same either in the event of time certification on the Internet or in the event of time certification on an Intranet.

Internal Operation of Storage Server at Time of Confirming Time Certification

Figure 23:
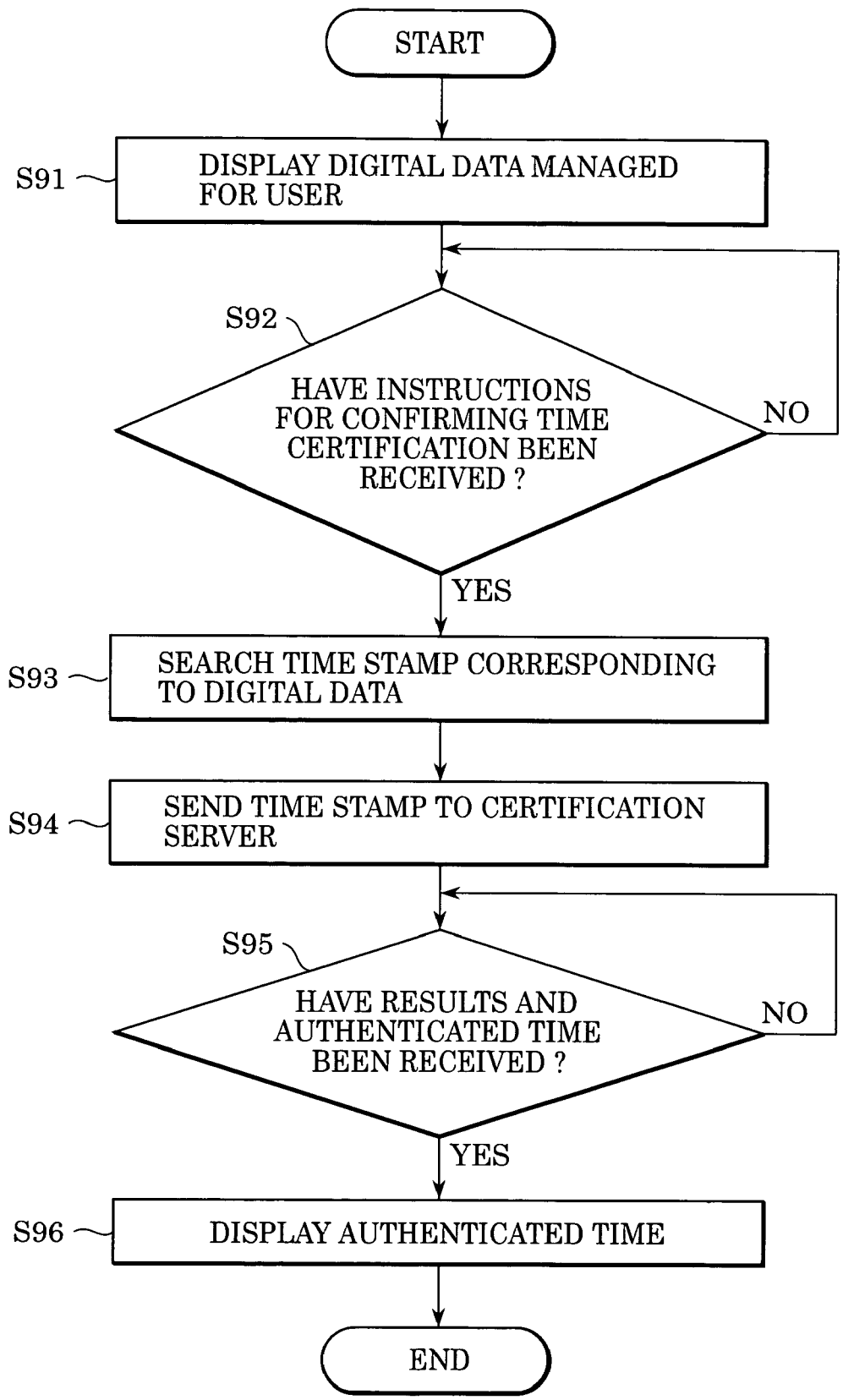
FIG. 23 is a flowchart illustrating the operational procedures of the storage server at the time of confirming time certification.

FIG. 23 is a flowchart illustrating operational procedures of the storage server 105 at the time of confirming time certification. This processing program is stored in the hard disk 167, and is executed by the CPU 161. First, the storage server 105 reads out the image data stored in the hard disk 167, and managed by the data management processing unit 158, and displays the image data on the user information processing device 103 via the network interface 152 and the network 101 (Step S91).

The storage server 105 waits until the user selects digital data, and the storage server 105 receives the instructions for confirming the time certification thereof (Step S92). That is to say, upon the user giving instructions to the information processing device 103, the instructions are sent to the data management processing unit 158 of the storage server 105 via the network 101. Thus, the storage server 105 starts confirmation processing of the digital data.

The storage server 105 searches a time stamp corresponding to the specified digital data with an internal management table thereof or another link file described with a marked up language such as XML as described above (Step S93), processes the searched time stamp with the time stamp data processing device 155, and identifies the time certification server 104 which performed time certification. The storage server 105 sends the time stamp managed by the data management processing unit 158 to the identified time certification server 104 via the network interface 152 and the network 101 so as to request the time certification server 104 to confirm time certification (Step S94). The structure of this time stamp is stipulated by standard specifications, and the method for identifying a time certification server is known, and accordingly description thereof is omitted here.

The storage server 105 waits until the network interface 152 receives the confirmed results of time certification sent from the time certification server 104 via the network 101 (Step S95). Upon the confirmed results of time certification being received, the storage server 105 sends the confirmed results to the time stamp data processing unit 155. The time stamp data processing unit 155 notifies the data management processing unit 158 of the results. The data management processing unit 158 notifies the user information processing device 103 of the results as well as the presences of the digital data and the time stamp so as to display these (Step S96). Processing of FIG. 23 (operational procedures of the storage server 105 at the time of confirming time certification) then ends.

Figure 24:
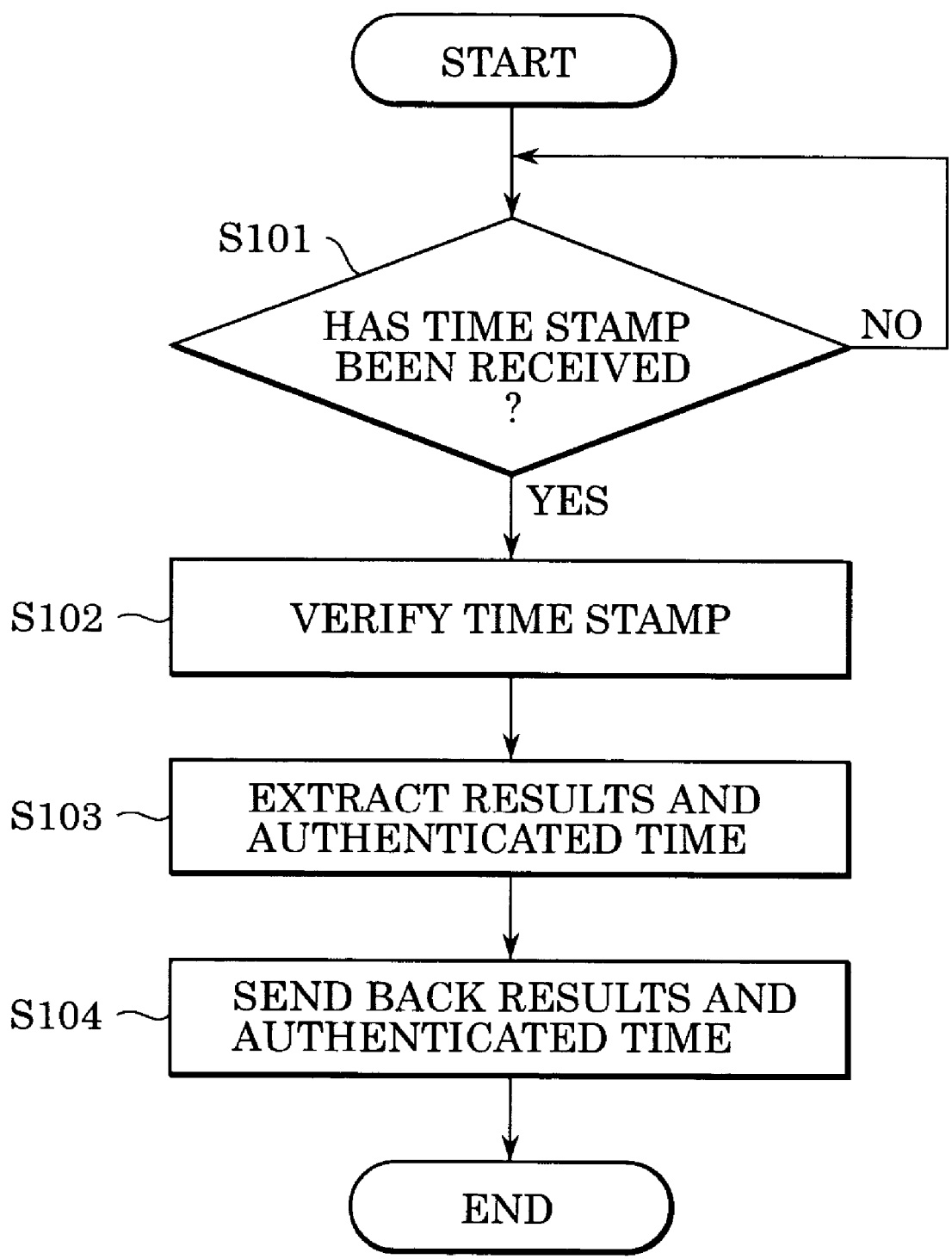
FIG. 24 is a flowchart illustrating the operational procedures of the time certification server at the time of confirming time certification.

FIG. 24 is a flowchart illustrating operational procedures of the time certification server 104 at the time of confirming time certification. This processing program is stored in the storage medium within the time certification server 104, and is executed by the CPU (not shown).

First, the time certification server 104 waits until it receives a time stamp (Step S101). Upon the time certification server 104 receiving a time stamp and a request for confirmation, the time certification server 104 decrypts the digital signature within the time stamp with the secret key possessed by the time certification server 104 alone and determines whether or not there has been tampering (Step S102). The determined results are extracted (Step S103) and the time information is filled in the time stamp (Step S104). Processing of FIG. 24 (operational procedures of the time certification server 104 at the time of confirming time certification) then ends. The protocol used for this certification sequence is the protocol specified by the time certification server. In general, this protocol is standardized, and a time stamp is acquired in accordance with this protocol.

Internal Operations of Storage Server when Downloading Digital Data

Figure 25:
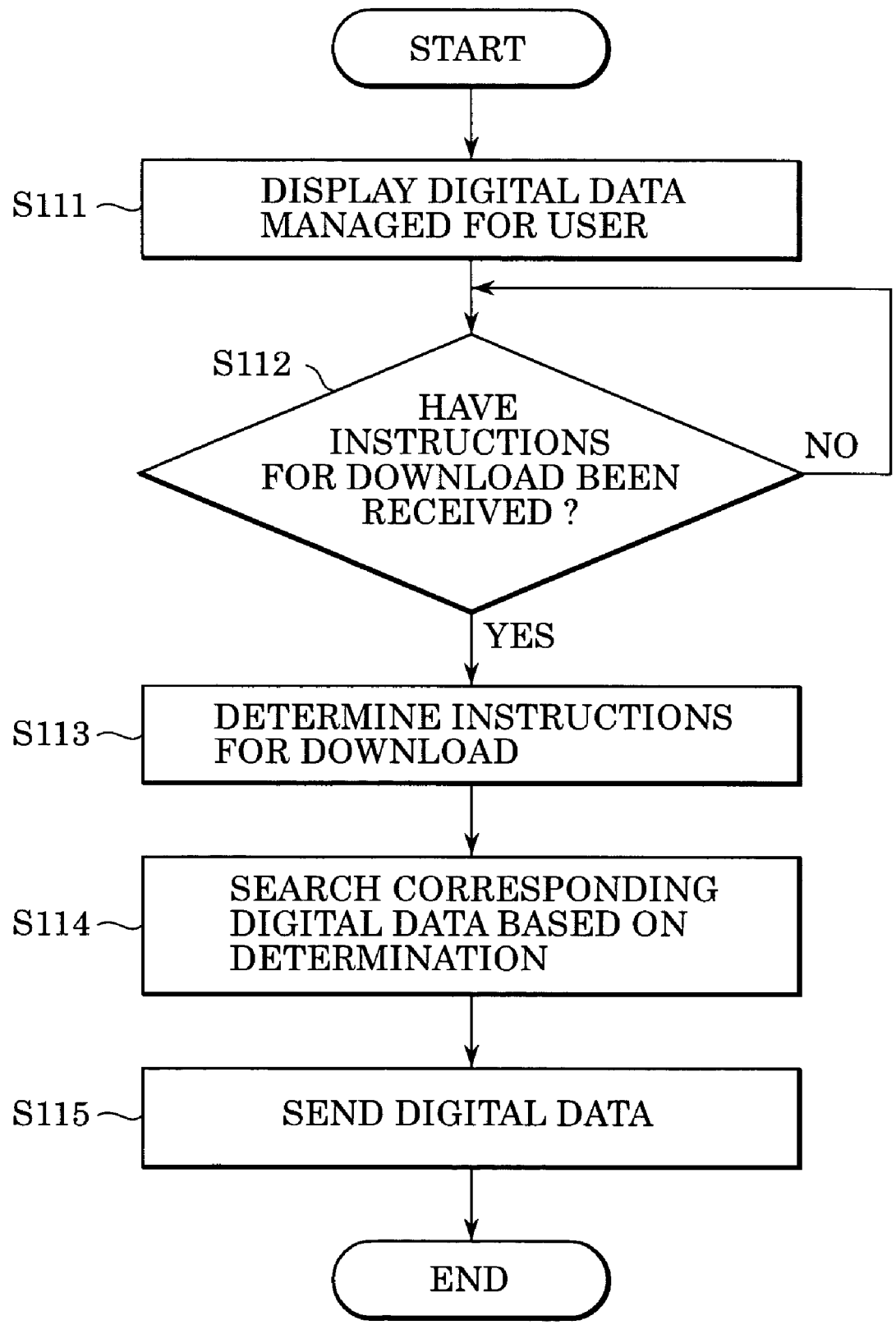
FIG. 25 is a flowchart illustrating the operational procedures of the storage server at the time of downloading digital data.

FIG. 25 is a flowchart illustrating operational procedures of the storage server 105 when downloading digital data. This processing program is stored in the hard disk 167 within the storage server 105, and is executed by the CPU 161. First, the storage server 105 reads out the image data stored in the hard disk 167, and managed by the data management processing unit 158, and displays the image data on the user information processing device 103 via the network interface 152 and the network 101 (Step S111). The user clearly specifies whether to download digital data in a data format that can be edited or whether to download digital data in a time-certified data format that cannot be edited, and instructs the storage server 105 to download digital data.

Subsequently, the storage server 105 determines whether the instructions of download are accepted (Step S112). That is to say, the storage server 105 determines whether or not the instructions of the user are sent to the data management processing unit 158 of the storage server 105 via the network 101. In the event that the instructions from the user are not sent to the data management processing unit 158, the storage server 105 waits until the instructions of download are accepted, and upon the instructions of download being accepted, the storage server 105 determines that instructions to download have been given (Step S113). That is to say, the request decision processing unit 157 within the storage server 105 determines the content of the instructions, and then determines whether to download digital data in the data format that can be edited or whether to download digital data in the time-certified data format that cannot be edited. The request decision processing unit 157 notifies the data management processing unit 158 of the determined results.

Subsequently, the data management processing unit 158 searches corresponding digital data based on the determined results for the instruction of downloading (Step S114), and sends the found corresponding digital data to the user information processing device 103 (Step S115). Processing of FIG. 25 (operational procedures of the storage server 105 when downloading digital data) then ends. In other words, the data management processing unit 158 sends appropriate data to the user based on the notice from the request decision processing unit 157. Specifically, in the event of the download request in the data format that can be edited, the data management processing unit 158 selects the digital data itself uploaded by the user, of managed digital data. On the other hand, in the case of the download request in the time-certified data format that cannot be edited, the data management processing unit 158 selects, from the managed digital data, the digital data in the time-certified data format that cannot be edited in which a time stamp is filled.

The data management processing unit 158 controls the network interface 152 to send the data selected according to the download request by the user via the network 101. Thus, the storage server 105 distinctly displays whether the digital data stored in the data format that can be edited or the digital data stored in the time-certified data format that cannot be edited, of the digital data stored therein, in order to control the user information processing device 103 to download the selected digital data.

User Operations when Creating Digital Data and Uploading to Storage Server

Operation at the time of creating digital data and uploading this to the storage server is described next. First, the user creates data with an application, such as Microsoft® Word, in the information processing device 103 represented by a PC (personal computer). When completing creation of the data, the user stores this data as digital data. In the event that the user wants to share this digital data such that others can edit this digital data, the user uploads this digital data to the storage server 105 over the network 101, and stores this digital data to the storage server 105.

The digital data may be created with the image processing device 102 represented by a copier and a multi-function printer. In this case, the user sets a paper document in the scanner equipped to the image processing device 102, and starts reading of the document. The image processing device 102 scans the paper document to read the image thereof, converts the image into digital data, such as TIFF, JPEG, or the like, and converts the digital data into a file format, such as multi-TIFF, PDF, or the like. Subsequently, the converted digital data is directly uploaded to the storage server 105 from the image processing device 102, or the digital data is temporarily transferred to the information processing device 103, and then is uploaded to the storage server 105 via the information processing device 103. Subsequently, the storage server 105 stores the uploaded digital data.

Figure 26:
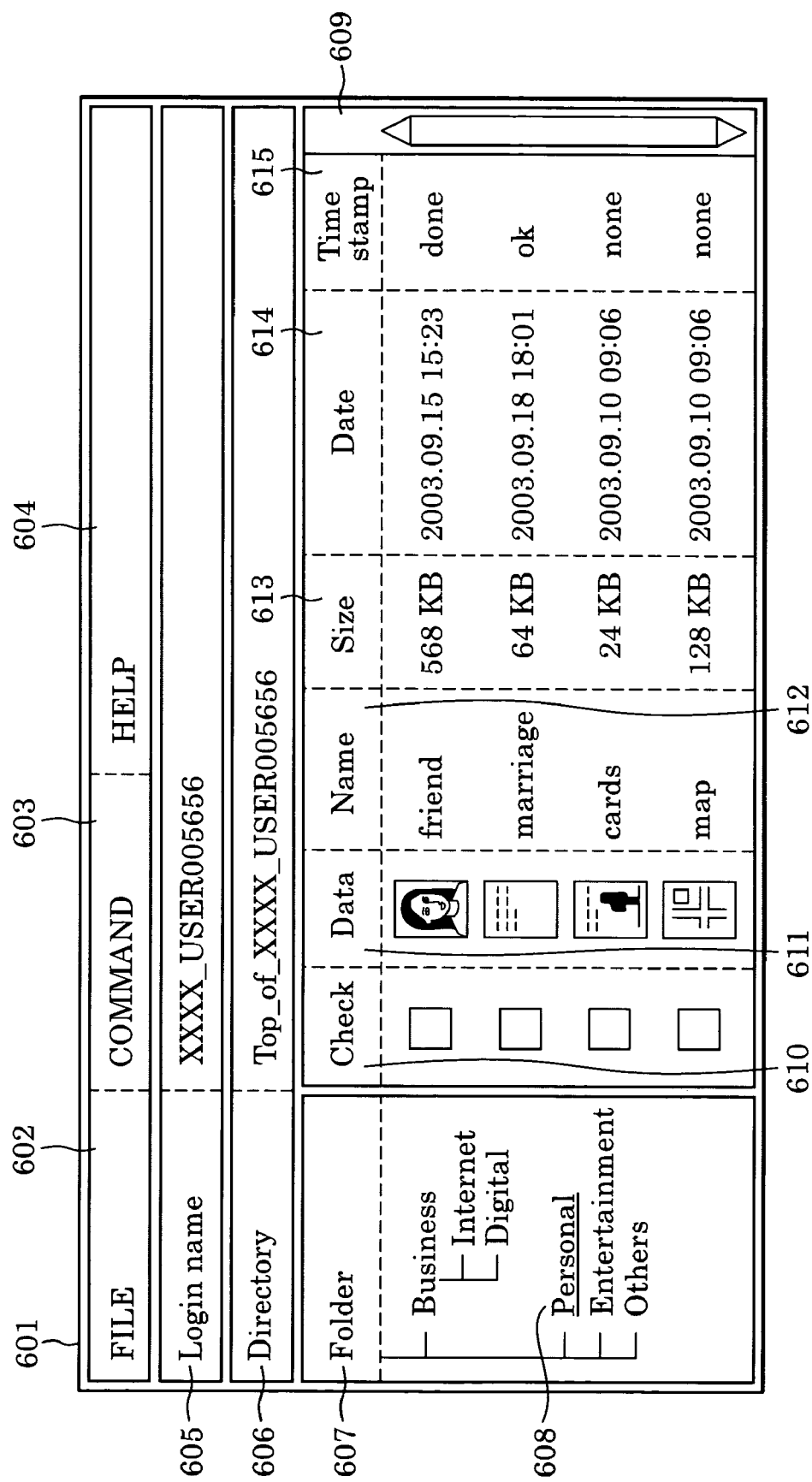
FIG. 26 is a diagram illustrating an operating screen at the time of logging into the storage service of the storage server.

FIG. 26 shows an exemplary operating screen in the event of logging into the storage service of the storage server 105. This operating screen is displayed on the display unit of the information processing device 103. On the first line of the screen, a menu bar 601 for selecting a command available in this screen is provided. Here, FILE 602, COMMAND 603, and HELP 604 are displayed, for example.

On the second line 605, the name of the user who logged into the storage server 105 is displayed. Here, the log-in name is "XXXX USER005656", for example. On the third line 606 of the screen, the top directory name that the user can access following logging into the storage server 105 is displayed. On a folder list screen 607 on the lower left side of the top directory name, a list of folders in the hierarchical levels below is displayed.

A digital data list screen 609 is displayed on the lower right side. The digital data within the folder (here, Personal 608) selected on the folder list screen 607 is displayed by a list. Various items of digital data are stored. For example, in the example shown in FIG. 26, the digital data includes four items ("friend", "marriage", "cards", and "map"). For each digital data, a digital data name 612, a digital data size 613, a creation date 614, a thumbnail image of a representative page 611, a time stamp 615, and the like are displayed. Desired digital data can be accessed with a folder name and the date thereof.

In exemplary embodiments, such as the one shown in FIG. 26, the operating screen is the operating screen of a dedicated application, however, any operating screen may be employed. In addition, examples of web clients that may be employed include Internet Explorer from Microsoft® Corporation, an HTTP (Hyper Text Transfer Protocol) client, and the like.

Figure 27:
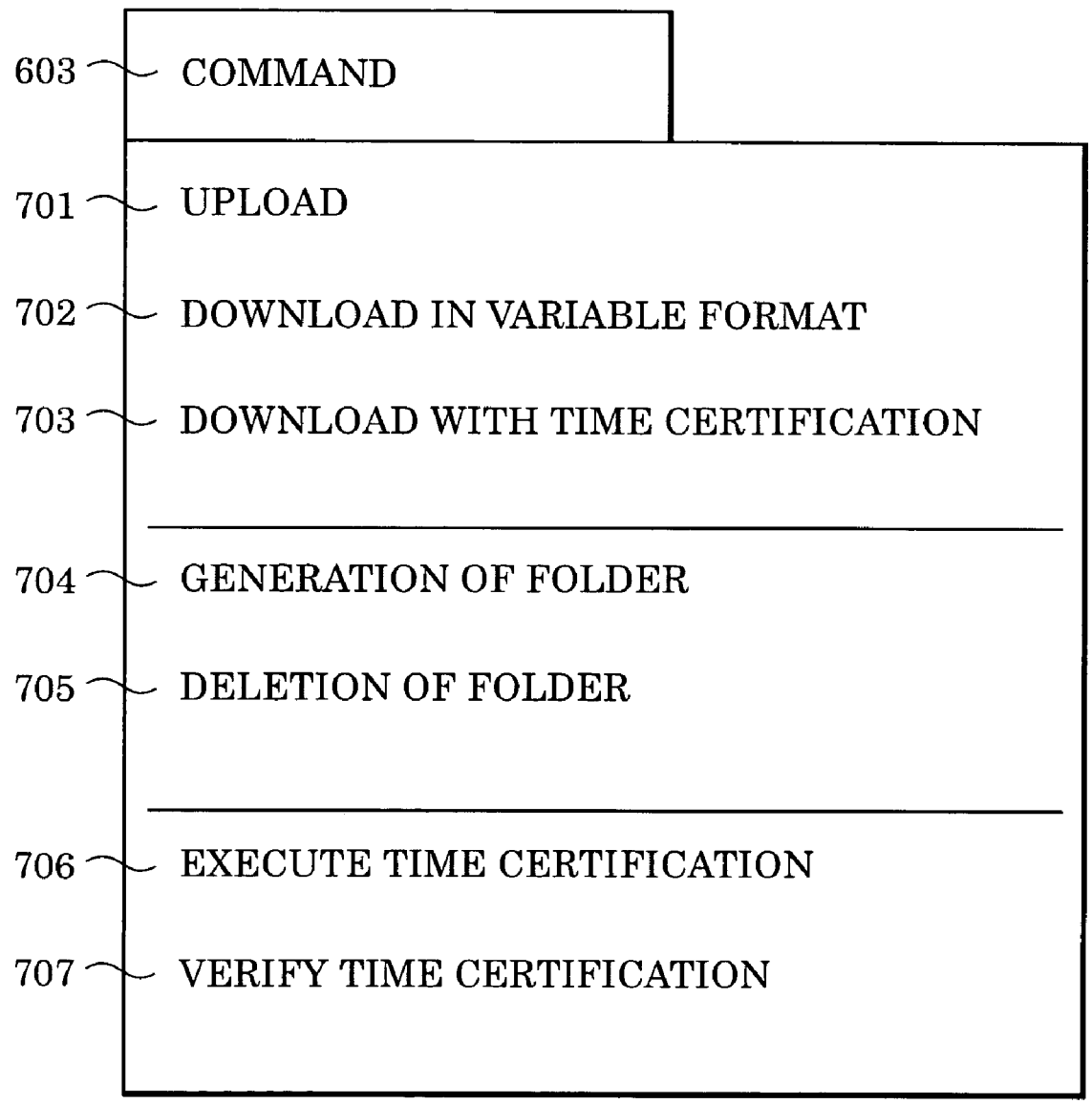
FIG. 27 is a diagram illustrating a command menu.
Figure 28A:
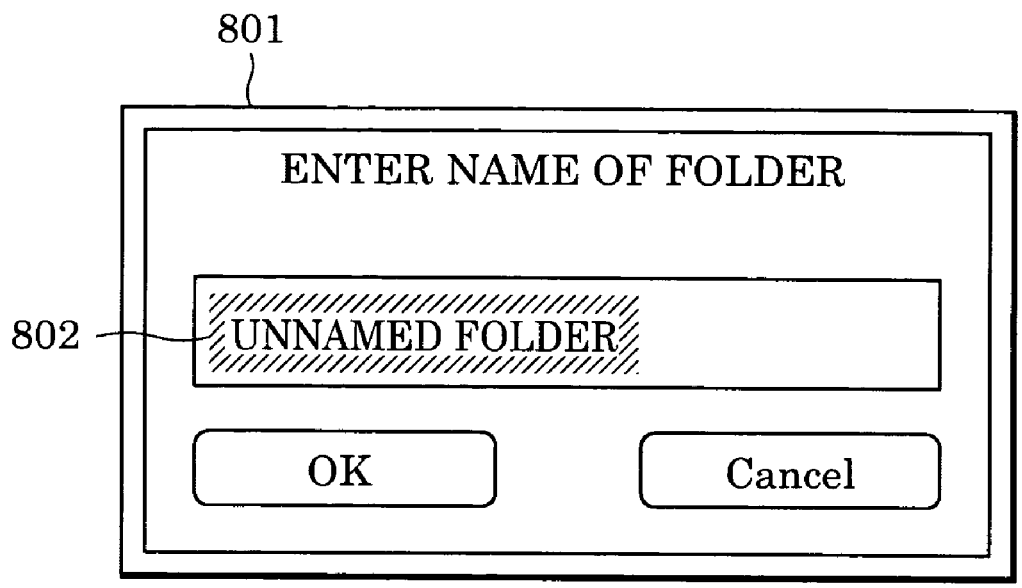
FIGS. 28A and 28B are diagrams illustrating a folder naming screen and an upload screen.

A case in which a folder is created in order to keep digital data in increments of sets of digital data at the time of uploading digital data to the storage server 105 is described next. Upon COMMAND 603 being selected from the menu bar 601 in FIG. 26, functions prepared as commands can be selected. FIG. 27 illustrates an exemplary command menu. Here, upon "GENERATION OF FOLDER" 704 being selected from the command menu, a folder naming screen 801 is displayed, as shown in FIG. 28A. Upon a folder name 802 being input in the folder naming screen 801, a new folder is created and is displayed on the folder list screen 607. Next, the user selects the newly created folder, and instructs to upload digital data in this folder. Upon "DELETION OF FOLDER" 705 being selected from the command menu, the selected folder is deleted.

Figure 28B:
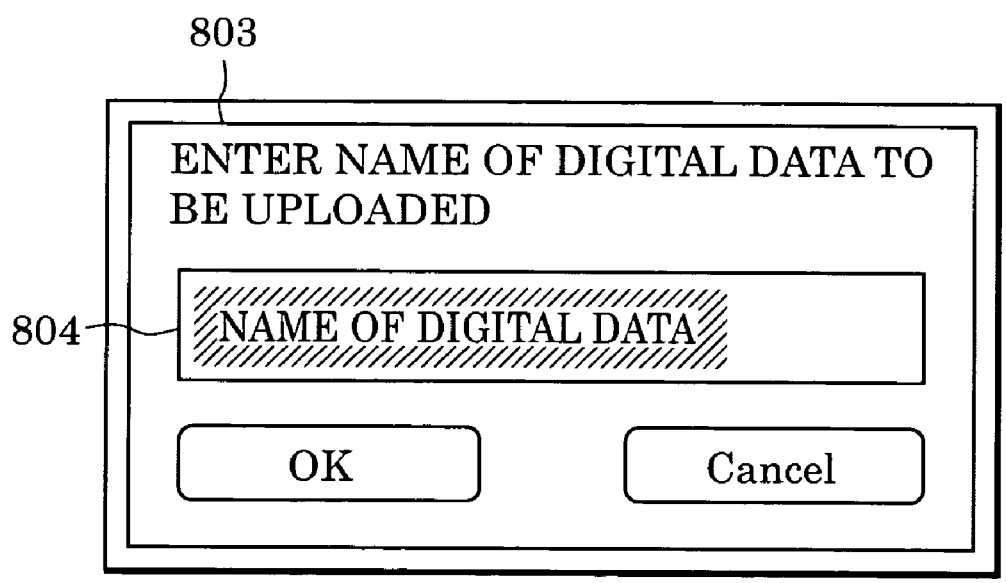

Upon COMMAND 603 being selected from the menu bar 601, and then UPLOAD 701 being selected from the command menu, a screen 803 for inputting the name of digital data to be uploaded is displayed, as shown in FIG. 28B. Upon a name of digital data 804 being input in the upload screen 803, the uploaded digital data is displayed on a digital data list screen 609 in FIG. 26. As described above, the digital data name 612, digital data size 613, creation date 614, thumbnail image of a representative page 611, time stamp 615, and the like are displayed on the digital data list screen 609. Upon the storage server 105 being accessed following uploading digital data, the digital data stored in the storage server 105 can be seen on the screen.

User Operations when Acquiring Time Certification

Operations at the time of acquiring time certification of the digital data stored in the storage server 105 are described next. First, the user logs into the storage server 105, and identifies desired digital data. These procedures are the same as those of uploading operations. Following identifying the digital data, the user instructs the storage server 105 to execute time certification service provided by the storage server 105.

On the operating screen in FIG. 26, upon the desired folder name within the folder list screen 607 being selected, the digital data stored within the folder is displayed. For example, upon Personal 608 within the folder list screen 607 being selected, four items of digital data stored within the folder are displayed on the digital data list screen 609. Here, four items of digital data: "friend", "marriage", "cards", and "map", are displayed, for example.

For example, operations for performing time certification of digital data named as "cards" are described next. With the digital data "cards", referring to the time stamp 615 thereof, "none" is displayed, which means that this digital data has not been subjected to time certification. Upon the checkbox of "cards" positioned in a check column 610 within the digital data list screen 609 being selected, the checkbox turns from □ to ■, i.e., the blank checkbox is filled in. Subsequently, the user executes "EXECUTE TIME CERTIFICATION" 706 from the command menu (FIG. 27) that is displayed when the user selects the COMMAND menu item 603. Upon a user confirmation screen being displayed, the storage server 105 performs time certification of the digital data "cards".

Note that while operational procedures for performing time certification of the digital data stored in the storage server 105 have been described above, these procedures are but an example. Accordingly, the procedures for selecting digital data, and the procedures for instructing time certification of the selected digital data are not restricted to any particular procedures as long as the user can give instructions to the storage server 105. These procedures may vary depending on the application to realize this screen and/or on the OS (Operating System).

Following time certification being performed by the time certification server 104, the storage server 105 receives a time stamp from the time certification server 104. The received time stamp is correlated with the digital data (here, for example, "cards") subjected to time certification, and then is stored. For example, as for correlation, a method for storing the digital data subjected to time certification and the time stamp in the same folder of the storage server 105 may be used. With the digital data list screen 609, since the digital data "friend" has been subjected to time certification, and the time stamp thereof has been stored, "done" is displayed in the time stamp 615.

User Operations when Confirming Time Certification

A user verification of time certification following acquiring time certification is described next. First, the user logs into the storage server 105, and selects the desired digital data. The selection procedures are the same procedures as those at the time of acquiring time certification described above. Of four items of digital data displayed on the digital data list screen in FIG. 26, the digital data "friend" shows "done" on the time stamp 615 thereof, which means that this digital data has been subjected to time certification, and the time stamp thereof has been stored. Upon the checkbox of "friend" positioned in a check column 610 being selected, the checkbox turns from □ to ■, i.e., the blank checkbox is filled in.

Figure 29A:
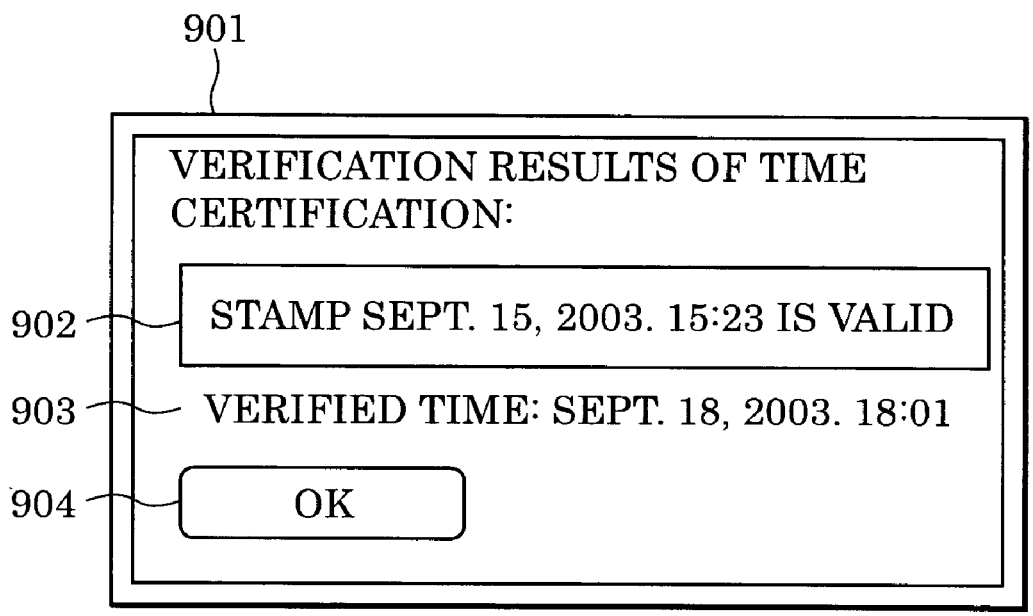
FIGS. 29A and 29B are diagrams illustrating the results of time certification.
Figure 29B:
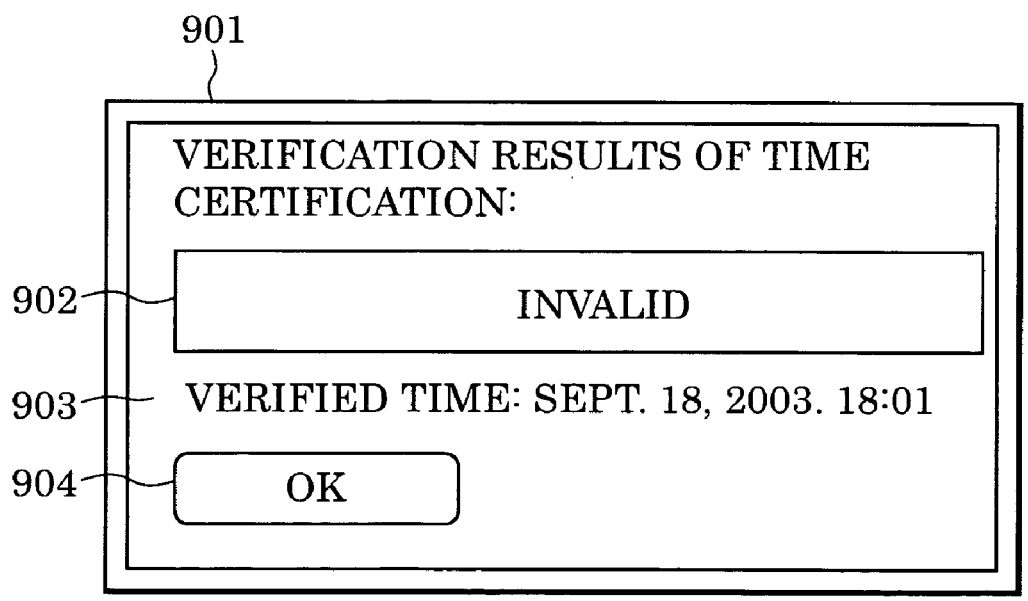

Subsequently, the user selects "VERIFY TIME CERTIFICATION" 707 from the command menu displayed upon selection of the COMMAND menu item 603 so as to execute verification. Following the user confirmation screen being displayed, the storage server 105 verifies time certification as to the digital data "friend". Subsequently, the storage server 105 displays the verified results sent from the time certification server 104 on the user information processing device 103. FIGS. 29A and 29B are diagrams illustrating the results of time certification. A window 901 includes a results display field 902, a verified time field 903, and an OK button 904. FIG. 29A shows the case in which the results of time certification are valid, and the stamp time and "VALID" are displayed in the results display field 902. On the other hand, FIG. 29B shows the case in which the results of time certification are invalid, and "INVALID" is displayed in the results display field 902. Furthermore, the time verified by the time certification server 104 is also displayed in the verified time field 903.

On the digital data list screen 609, the digital data "marriage" has been subjected to time certification, and the time stamp thereof has been stored, and also verification has been performed by the time certification server 104, and in the event that the verification is valid, "OK" is displayed in the time stamp 615.

Figure 30:
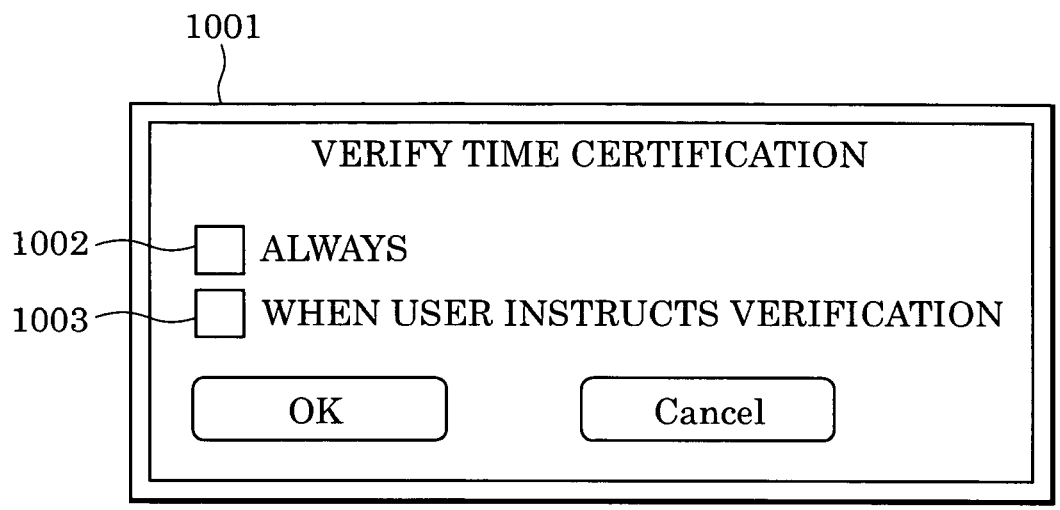
FIG. 30 is a diagram illustrating an optional screen at the time of verifying time certification.

"VALID" of the verified results assures that the time stamp has been created by the time certification server 104, and that there has been no tampering from creation until verification. In other words, no tampering after this verification cannot be assured, and accordingly, validity for the future cannot be assured. However, the user would like to assure that the digital data is valid at the time of verification. This is satisfied by an arrangement in which verification of time certification is always performed when accessing the storage server 105, and the results being displayed. FIG. 30 is illustrates an optional screen 1001 for verifying time certification. On the optional screen 1001, the checkbox for "ALWAYS" 1002, and the checkbox for "WHEN USER INSTRUCTS VERIFICATION" 1003 are provided. Selecting one of the checkboxes selects whether verification is always performed, or whether verification is performed only when the user specifies verification as an option at the time of verifying time certification. Thus, the user can easily recognize the presence of a time stamp and the validity thereof as to the desired digital data.

Figure 31:
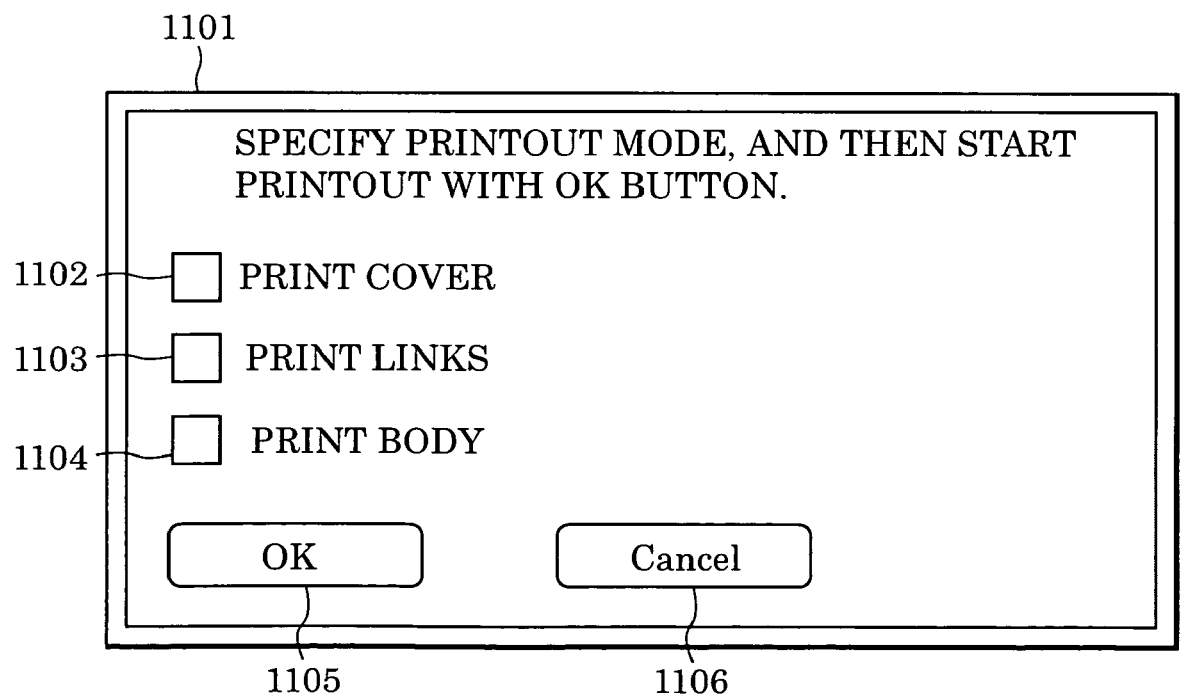
FIG. 31 is a diagram illustrating a print specification screen of verified results.

Printing the verified results of time certification is described next. The screen of the verified results shown in FIG. 29A or 29B is displayed, and upon the "OK" button 904 being depressed, a screen 1101 for instructing printout of the results is displayed. FIG. 31 illustrates the printout specification screen of the verified results. With this printout specification screen 1101, the user can select a printout mode. On the screen 1101, the checkbox of "PRINT COVER" 1102, the checkbox of "PRINT LINKS" 1103, the checkbox of "PRINT BODY", an "OK" button 1105, and a "Cancel" button 1106 are displayed.

The cover printout mode (selected via the "PRINT COVER" checkbox 1102) is a mode for printing verified results as well as a thumbnail image, name, and date according to the content displayed on the screen. The link printout mode selected via the "PRINT LINKS" checkbox 1103) is a mode for printing link data indicating link to the digital data stored in the storage server 105. The body printout mode (selected via the "PRINT BODY" checkbox 1104) is a mode for printing all pages of the digital data subjected to time certification stored in the storage server 105. These printout modes may be specified in combination.

Following specifying the printout mode, the user starts printout by depressing the "OK" button 1105. Upon printout being performed by specifying these printout modes, specified options are printed as well as validity of the verified results of time certification, time of time certification, ID information, such as the name of the storage server 104 which issues a time stamp, and basic information made up of verified time of time certification. In the event of invalidity, the specified options are printed as well as the verified results. In the event that the "Cancel" button 1106 is depressed, printout is not performed.

FIG. 32 illustrates a printout example of verified results of time certification. An output sheet 1201 on which basic information is printed is displayed in FIG. 32. On this output sheet 1201, name of digital data 1202 (here, "marriage"), verified results 1203 (here, "VALID"), certified time 1204 (here, "Sep. 15, 2003 15:23"), name of certification server 1205 (here, "XXXXX"), verified time of time certification 1206 (here, "Sep. 18, 2003 18:01") are printed as basic information.

In the event that the cover printout mode is specified, a cover output sheet 1211 is printed. On this cover output sheet 1211, name of digital data 1212 (here, "marriage"), creation date of digital data 1213 (here, "Sep. 10, 2003 10:10"), verified results 1214 (here, "VALID"), and thumbnail image of representative page 1215 are printed.

In the event that the link printout mode is specified, a link output sheet 1221 is printed. On this link output sheet 1221, name of digital data 1222 (here, "marriage"), and link information to digital data 1223 are printed. As for the link information 1223, link information converted into a barcode is printed, and reading this with a barcode scanner enables the link information to be input with accuracy.

In the event that the body printout mode is specified, a body output sheet 1231 is printed. Digital data is printed on this output sheet 1231. These output sheets 1201, 1211, 1221, and 1231 may be printed on the same sheet as well as on respective sheets. Performing such an operation allows the user to obtain the certified time with a time stamp and the digital data subjected to time certification, and confirm the output sheet subjected to time certification.

User Operations when Downloading Digital Data from Storage Server

Acquiring the digital data stored in the storage server 105 is described next. Download is performed in two cases: (1) the case in which the digital data stored is downloaded in the changeable data format in order to edit the digital data; and (2) the case in which the digital data is downloaded in the time-certified unchangeable data format in order to certify the digital data subjected to time certification by sending this to the third party. The digital data to be downloaded differs depending on each case.

The user clearly specifies whether download is a download in the changeable data format, or a download in the time-certified unchangeable data format, and then instructs download. The operational procedures are described below.

First, the user selects the digital data subjected to time certification. In the example shown in FIG. 26, the upper two items ("friend" and "marriage") of the digital data displayed on the digital data list screen 609 are the digital data subjected to time certification, and the lower two items ("cards" and "map") are the digital data not subjected to time certification. The user selects the digital data to be downloaded from these items.

Upon the checkbox of the check column 610 being selected, the display thereof turns from ☐ to ■, i.e., the blank checkbox is filled in. Subsequently, the user executes download from the command menu displayed upon selection of the COMMAND menu item 603. As described above, in the event of a download in the changeable data format for editing digital data, the user selects "DOWNLOAD IN VARIABLE FORMAT" 702 from the command menu, and in the event of downloading the digital data subjected to time certification in the time-certified unchangeable data format, the user selects "DOWNLOAD WITH TIME CERTIFICATION" 703 from the command menu. The user notifies the storage server 105 of the desired digital data format with such operations. Thus, the user can download the digital data in the desired data format from the storage server 105.

As described above, according to the present embodiment, time certification of the data stored in the storage server can be easily performed, and time-certified data can be prevented from modification and tampering. Moreover, the data stored can be sent in the changeable data format or in the unchangeable data format. Furthermore, time certification of the data stored in the storage server can be easily verified. Thus, the user can download the digital data stored in the storage server in the changeable data format so as to edit the digital data, or download the digital data subjected to time certification in the unchangeable data format so as to send the digital data subjected to time certification to the third party for proof.

Consequently, problems, such as those described below, are solved. In the event of permitting a detached and fair third party to certify the time when the created data exists, this detached and fair third party who gives proof of this is a so-called time certifying authority. The certifying authority provides service for performing time certification by affixing time data (time stamp) based on time kept by a precise clock on the Internet. Since the time certifying authorities have functions satisfying the standard specifications, counted time, i.e., a time stamp provided by the time certifying authority is recognized as a correct time stamp by others. In other words, both a person who requests the time certifying authority to affix a time stamp and a person who requests the time certifying authority to confirm a time stamp trust the time certifying authority, and therefore trust the time stamp. However, requesting the time certifying authority to affix a time stamp and requesting the time certifying authority to confirm the affixed time stamp are usually performed on a PC (Personal Computer).

The specific procedures are described next. Following generating digital data on the PC, the user calculates the hash value of the digital data, selects the time certifying authority to give time certification, and sends the hash value to the time certifying authority. Subsequently, the user receives the time stamp created by the time certifying authority, and manages the digital data of a paper document and the associated received time stamp. In the event of requesting the time certifying authority to confirm the time stamp, the user sends the time stamp to the time certifying authority, receives the results confirmed by the time certifying authority, and displays the results on the screen of the PC. Thus, in this case, although time certification and confirmation thereof are performed, the digital data subjected to time certification and the time stamp certifying the time are stored as a separate file, and accordingly, the management thereof is complicated.

Consequently, if generation and confirmation of time certification can be performed at the storage server storing digital data, the user can save a great deal of labor regarding the management of files. However, while conventional storage servers can provide access restrictions, once digital data is downloaded from the storage server to a local digital data processing device, modification thereof cannot be prevented. The time stamp and digital data thereof, which have been subjected to time certification, should not be modified after time certification. With the storage server described herein, in the event that the digital data is modified after time certification, this digital data is considered to be invalid data by means of the time stamp subjected to time certification, therefore solving the above-described problems.

Description has been made to exemplary embodiments of the present invention, however, the present invention is not restricted to these configurations. The present invention may be applied to any configuration as long as the functions shown in the spirit and scope of the appended claims, or the functions according to the present embodiment can be achieved.

For example, equipping the storage server with a time certification server function enables a configuration in which the storage server need not perform time certification via the network. With this configuration, while time display used by the storage server is generally recognized as a correct time display, the validity of the time attribute of the data extracted from the storage server is not always certified, and accordingly, the need for time certification still exits.

An arrangement may be made in which the operating screen operated by the user is displayed on the display unit of the storage server and accepts instructions from the user. Alternatively, an arrangement may be made in which the operating screen operated by the user is displayed on the display unit of the information processing device or image processing device (MFP) via the network 101 and accepts instructions from the user, and the storage server receives the instructions via the network 101. The present invention can be applied to either of these cases.

According to the present invention, the storage server requests time certification of the data selected from the changeable data, acquires time information obtained as the results of the time certification, generates changeable data by affixing the obtained time information on the selected data, and in the event that the data subjected to time certification is requested, sends the generated changeable data, so that time certification of the data stored can be easily performed. This prevents modification and tampering of the data subjected to time certification.

The storage medium, in which the program code of the software for realizing the functions of the embodiment is recorded, may be supplied to the system or the device. The computer (or CPU or MPU (micro-processing unit) or the like) of the system or the device reads and executes the program code stored in the storage medium.

In this case, the program code itself read out from the storage medium realizes the above-described functions.

Examples of the storage medium for supplying the program code include ROM, floppy disks, memory cards, such as PCMCIA cards, compact Flash®, hard disks, micro DATs (digital audio tapes), magneto-optical disks, optical disks such as CD-R (compact disk-recordable) and CD-RW (compact disk-rewritable), and phase change type optical disks, such as DVDs (digital versatile disks).

The present invention is not restricted to cases in which the functions are realized by executing the program code read out by the computer. For example, cases in which the operating system or the like operating on the computer realize the functions in part or in all, based on the instructions of the program code are also encompassed in the present invention.

Furthermore, cases in which the program code read out from the storage medium is written into memory provided on a function expansion board inserted in the computer or a function expansion unit connected to the computer, and then the CPU or the like provided on the function expansion board or function expansion unit performs a part or all of the actual processing, based on the instructions of the program code, where the processing realizes the functions, is also encompassed in the present invention.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing device comprising:
   an image capturing unit configured to capture an image and generate digital data corresponding to the captured image;
   a time certification request unit configured to request a server for performing time certification on the generated digital data in order to acquire time information from the server corresponding to the time at which the digital data is present;
   a storage control unit configured to control the acquired time information to be stored in a storage apparatus; and
   a printing unit configured to print the digital data with storage location information indicating a storage location of the stored time information, on a sheet, to specify the storage location of the stored time information by capturing an image which is printed by the printing unit on the sheet and extracting the storage location information from the captured image.

2. A data processing device according to claim 1, further comprising:
   a storage location information extract unit configured to extract the storage location information from the image on the sheet which is captured by the image capturing unit; and
   a time information readout unit configured to read out the time information from the storage apparatus indicated by the read out storage location information.

3. A data processing device according to claim 2, further comprising:
   a verification result acquisition unit configured to request verification of the time information, and acquire the verification result of the time information; and
   a time information output unit configured to output the verified time information if the verification of the time information has succeeded.

4. A data processing device according to claim 3, further comprising:
   a display unit configured to display a selection screen including a selection of whether to print the verified time information and the digital data simultaneously or to print the verified time information alone,
   wherein the time information output unit prints the verified time information and the digital data simultaneously or prints the verified time information alone in accordance with the selection on the selection screen.

5. A data processing device according to claim 1, further comprising:
   an image formation unit configured to form time stamp image data based on the acquired time information to be printed with the digital data; and a printout unit configured to print the time stamp image data and the digital data on a sheet.

6. A data processing device according to claim 5, further comprising:

a display unit configured to display a selection screen including a selection of whether to print the digital data with both information indicating a time that the time certification was performed and the storage location information or to print the digital data alone, wherein the printout unit prints the digital data, the storage location information and the time stamp image data on the sheet, or prints the digital data alone, in accordance with the selection on the selection screen.

7. A data processing device according to claim 1, further comprising:

a display unit configured to display a selection screen including a selection of the server for performing the time certification; and a time certifying authority selecting unit configured to select the server in accordance with the selection on the selection screen, wherein the time certification request unit requests the selected server to perform time certification.

8. A data processing device according to claim 1, further comprising:

a display unit configured to display a selection screen including a selection of the storage location for storing the acquired time information; and a storage location-selecting unit for selecting the storage location in accordance with the selection on the selection screen, wherein the storage control unit controls the time information to be stored in the selected storage location.

9. A data processing device according to claim 1, further comprising:

a receiving unit configured to receive digital data from an external device, wherein the time certification request unit requests time certification of the received digital data as well as the digital data generated by the image capturing unit, and acquires time information to be acquired as a result of time certification performed by the server.

10. A data processing device according to claim 1, wherein the time certification request unit sends a hash value of the digital data to the server and acquires a digital signature from the server, wherein the server generates the digital signature corresponding to the time information and the hash value with a secret key.

11. A data processing device according to claim 1, wherein the image capturing unit captures the image on a sheet and generates the digital data corresponding to the image.

12. A data processing method comprising:

capturing an image;

generating digital data corresponding to the captured image;

requesting a server to perform time certification on the generated digital data in order to acquire time information from the server corresponding to the time at which the digital data is present;

controlling the acquired time information to be stored in a storage apparatus; and printing the digital data with storage location information indicating a storage location of the stored time information, on a sheet, to specify the storage location of the stored time information by capturing an image which is to be printed on the sheet and extracting the storage location information from the captured image.

* * * * *